US012412518B2

(12) United States Patent
An et al.

(10) Patent No.: US 12,412,518 B2
(45) Date of Patent: Sep. 9, 2025

(54) DRIVING CONTROLLER, DISPLAY DEVICE INCLUDING THE SAME, AND OPERATION METHOD OF DISPLAY DEVICE

(71) Applicant: SAMSUNG DISPLAY CO., LTD., Yongin-si (KR)

(72) Inventors: Jungeon An, Yongin-si (KR); Kihyun Pyun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/745,681

(22) Filed: Jun. 17, 2024

(65) Prior Publication Data

US 2025/0140166 A1 May 1, 2025

(30) Foreign Application Priority Data

Oct. 25, 2023 (KR) ........................ 10-2023-0144109

(51) Int. Cl.
*G09G 3/32* (2016.01)

(52) U.S. Cl.
CPC ....... *G09G 3/32* (2013.01); *G09G 2310/0275* (2013.01); *G09G 2320/0271* (2013.01); *G09G 2320/0276* (2013.01); *G09G 2320/0673* (2013.01); *G09G 2330/021* (2013.01); *G09G 2330/028* (2013.01)

(58) Field of Classification Search
CPC .... G09G 3/32–3291; G09G 2300/0861–0871; G09G 2310/0243; G09G 2310/027–0275; G09G 2310/0289; G09G 2310/06; G09G 2310/08; G09G 2320/0233; G09G 2320/0242; G09G 2320/0271; G09G 2320/0276; G09G 2320/04; G09G 2320/043–048; G09G 2320/062; G09G 2320/0626;
(Continued)

(56) References Cited

U.S. PATENT DOCUMENTS 9,373,298 B2 6/2016 Shin et al.
9,837,037 B2 12/2017 Hwang et al.
(Continued)

FOREIGN PATENT DOCUMENTS

KR 10-1698570 1/2017
KR 10-2342739 12/2021

*Primary Examiner* — Nathan Danielsen
(74) *Attorney, Agent, or Firm* — F. CHAU & ASSOCIATES, LLC

(57) ABSTRACT

Provided is a display device comprising a display panel, a driving controller that receives an input image signal and outputs an image data signal, a voltage generator that generates a plurality of gamma voltages in response to a voltage control signal, and a data driving circuit that receives the plurality of gamma voltages and provides a data signal corresponding to the image data signal to the display panel. The driving controller operates between in a normal mode and in a power-saving mode. During the power-saving mode, the driving controller outputs the voltage control signal for changing voltage levels of the plurality of gamma voltages in response to the input image signal and a peak signal. At least one of the plurality of gamma voltages has a first voltage level during the normal mode and has a second voltage level lower than the first voltage level during the power-saving mode.

20 Claims, 14 Drawing Sheets

(58) Field of Classification Search
CPC ..... G09G 2320/0673; G09G 2330/021; G09G 2330/028
See application file for complete search history.

(56) References Cited

U.S. PATENT DOCUMENTS

| | | | | |
|---|---|---|---|---|
| 2012/0306947 | A1* | 12/2012 | Kim | G09G 3/3233<br>345/694 |
| 2014/0320546 | A1* | 10/2014 | Lim | G09G 3/3291<br>345/77 |
| 2014/0375704 | A1* | 12/2014 | Bi | G09G 3/3275<br>345/694 |
| 2016/0155382 | A1* | 6/2016 | Cheon | G09G 3/3258<br>345/76 |
| 2017/0124959 | A1* | 5/2017 | Kim | G09G 3/3225 |
| 2021/0193047 | A1* | 6/2021 | Kwon | G09G 3/3258 |
| 2023/0360598 | A1* | 11/2023 | Pyun | G09G 3/20 |

* cited by examiner

DRIVING CONTROLLER, DISPLAY DEVICE INCLUDING THE SAME, AND OPERATION METHOD OF DISPLAY DEVICE

CROSS-REFERENCE TO RELATED APPLICATIONS

This application claims priority under 35 U.S.C. § 119 to Korean Patent Application No. 10-2023-0144109 filed on Oct. 25, 2023, in the Korean Intellectual Property Office, the disclosures of which are incorporated by reference herein in their entireties.

BACKGROUND

1. Technical Field

The present disclosure relates to a display device including a driving controller, and more particularly to a display device capable of preventing power consumption of a display panel and an operation method of the display device.

2. Description of the Related Art

A display device is a component of an electronic device that shows an image to the user. Examples of these devices include smartphones, digital cameras, notebook computers, navigation systems, monitors, and smart televisions. The image is created by the display device and shown to the user via a display screen.

The display device includes a display panel and a driving controller for controlling the display panel. An image is displayed when the driving controller sends data signals to the display panel and the pixels on the display panel receive the currents that correspond to the data signals. Generally, it is ideal to prevent the increase in power consumption of the display device. To this end, the driving controller may play an important role because it may adjust the luminance of the display panel based on a load of an input image signal

SUMMARY

Embodiments of the present disclosure provide a driving controller capable of preventing power consumption of a display panel, a display device including the same, and an operation method of the display device.

According to an embodiment, a display device includes a display panel, a driving controller that receives an input image signal and generates an output of an image data signal based on the input image signal, a voltage generator that generates a plurality of gamma voltages in response to a voltage control signal, and a data driving circuit that receives the plurality of gamma voltages and provides a data signal corresponding to the image data signal to the display panel. The driving controller operates between in a normal mode and in a power-saving mode. In the power-saving mode, the driving controller generates the voltage control signal for changing voltage levels of the plurality of gamma voltages in response to the input image signal and a peak signal. At least one of the plurality of gamma voltages has a first voltage level in the normal mode and has a second voltage level lower than the first voltage level in the power-saving mode.

In an embodiment, the driving controller may generate a peak gray signal corresponding to the input image signal and the peak signal, may generate a maximum voltage code based on a peak voltage code corresponding to the peak gray signal and a degradation compensation value corresponding to an operating time, and may generate an output of the voltage control signal corresponding to the maximum voltage code.

In an embodiment, the driving controller may operate in the power-saving mode when the maximum voltage code is smaller than a reference value and may operate in the normal mode when the maximum voltage code is equal to the reference value.

In an embodiment, the voltage generator may further generate a power supply voltage to the data driving circuit.

In an embodiment, the driving controller may generate the voltage control signal for changing a voltage level of the power supply voltage in the power-saving mode.

In an embodiment, in the power-saving mode, the voltage level of the power supply voltage may be lower than the voltage level of the power supply voltage in the normal mode.

In an embodiment, the driving controller may include a power control module that outputs a peak gray signal in response to the peak signal, a peak voltage memory that stores a peak voltage code corresponding to the peak gray signal from the power control module, a degradation compensator that provides a degradation compensation value corresponding to an operating time, a maximum voltage calculator that generates an output of a maximum voltage code based on the peak voltage code from the peak voltage memory and the degradation compensation value from the degradation compensator, and a voltage controller that generates an output of the voltage control signal based on the maximum voltage code from the maximum voltage calculator.

In an embodiment, the maximum voltage calculator may add the peak voltage code and the degradation compensation value and may output the maximum voltage code corresponding to a result of an addition of the peak voltage code and the degradation compensation value.

In an embodiment, in the power-saving mode, some of the plurality of gamma voltages whose voltage levels are lower than a voltage level corresponding to the maximum voltage code may be maintained at the same voltage levels as the normal mode.

In an embodiment, in the power-saving mode, one of the plurality of gamma voltages whose voltage level is higher than a voltage level corresponding to the maximum voltage code and is the closest to the voltage level corresponding to the maximum voltage code may be maintained at the same voltage level as the normal mode.

In an embodiment, in the power-saving mode, at least one of the plurality of gamma voltages whose voltage level is higher than a voltage level corresponding to the maximum voltage code may be changed to be lower in level than in the normal mode.

In an embodiment, the degradation compensator may receive a feedback current from the display panel and may provide the degradation compensation value based on the feedback current and the operating time.

According to an embodiment, a driving controller includes a power control module that outputs a peak gray signal in response to a peak signal, a peak voltage memory that stores a peak voltage code corresponding to the peak gray signal provided from the power control module, a degradation compensator that provides a degradation compensation value corresponding to an operating time, a maximum voltage calculator that outputs a maximum voltage code based on the peak voltage code provided from the peal power voltage memory and the degradation compensation value provided from the degradation compensator, and a voltage controller that outputs a voltage control signal for adjusting voltage levels of a plurality of gamma voltages based on the maximum voltage code provided from the maximum voltage calculator.

In an embodiment, the voltage controller may operate in a power-saving mode when the maximum voltage code is smaller than a reference value and may operate in a normal mode when the maximum voltage code is equal to the reference value.

In an embodiment, the maximum voltage calculator may add the peak voltage code and the degradation compensation value and may output the maximum voltage code corresponding to a result of an addition of the peak voltage code and the degradation compensation value.

In an embodiment, in the power-saving mode, the voltage controller may maintain some of the plurality of gamma voltages whose voltage levels are lower than a voltage level corresponding to the maximum voltage code at the same voltage levels as the normal mode.

In an embodiment, during the power-saving mode, the voltage controller may maintain one of the plurality of gamma voltages whose voltage level is higher than a voltage level corresponding to the maximum voltage code and is the closest to the voltage level corresponding to the maximum voltage code at the same voltage level as the normal mode.

In an embodiment, during the power-saving mode, the voltage controller may change at least one of the plurality of gamma voltages whose voltage level is higher than a voltage level corresponding to the maximum voltage code to be lower in level than in the normal mode.

According to an embodiment, an operation method of a display device includes generating a plurality of gamma voltages in response to a voltage control signal, providing a data signal corresponding to an input image signal to a display panel based on the plurality of gamma voltages, and generating the voltage control signal in response to the input image signal and a peak signal such that a voltage level of each of the plurality of gamma voltages corresponds to one of a normal mode and a power-saving mode, and at least one of the plurality of gamma voltages has a first voltage level in the normal mode and has a second voltage level lower than the first voltage level in the power-saving mode.

In an embodiment, the generating of the voltage control signal may be accomplished by generating a peak voltage code in response to the input image signal and the peak signal, generating a degradation compensation value corresponding to an operating time, generating a maximum voltage code based on the peak voltage code and the degradation compensation value, and generating the voltage control signal based on the maximum voltage code.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
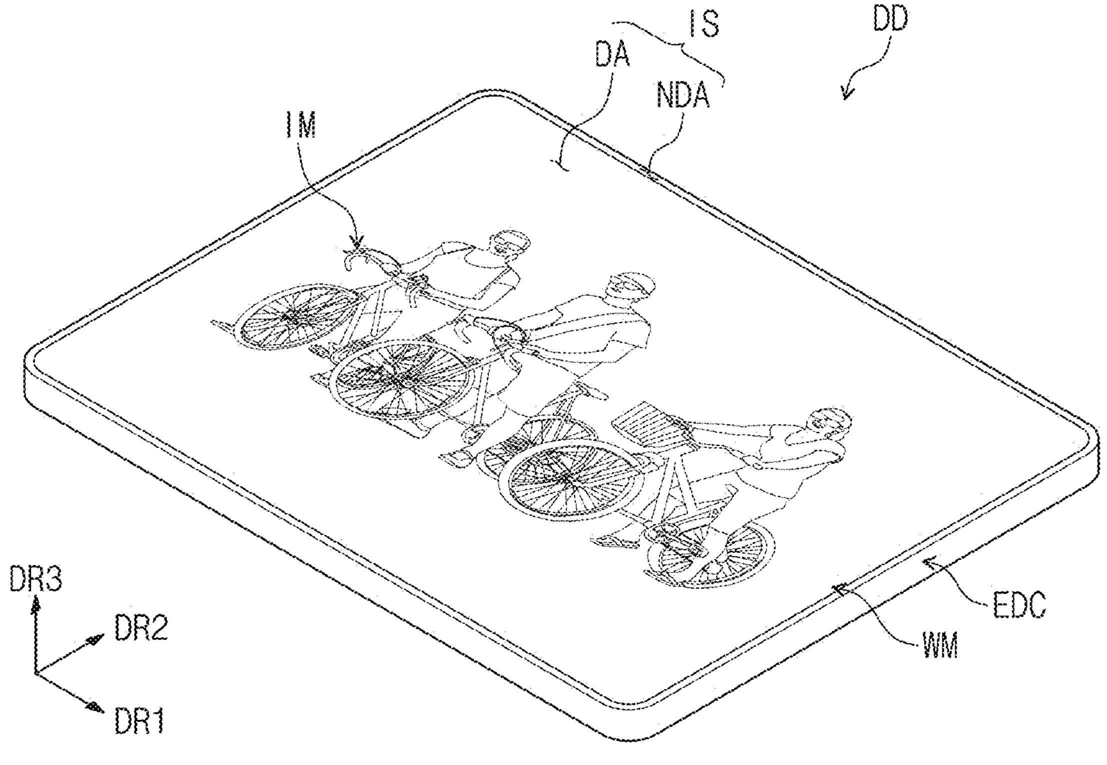
FIG. 1 is a perspective view of a display device according to an embodiment of the present disclosure.

In the specification, the expression that a first component (or region, layer, part, etc.) is "on", "connected to", or "coupled to" a second component means that the first component is directly on, connected to, or coupled to the second component or means that a third component is interposed therebetween.

The same reference numerals/signs refer to the same components. In addition, in drawings, thicknesses, proportions, and dimensions of components may be exaggerated to describe the technical features effectively. The term "and/or" includes one or more combinations of the associated listed items.

The terms "first", "second", etc. are used to describe various components, but the components are not limited by the terms. The terms are only used to distinguish one component from another component. For example, without departing from the scope and spirit of the disclosure, a first component may be referred to as a "second component", and similarly, the second component may be referred to as the "first component". The singular forms are intended to include the plural forms unless the context clearly indicates otherwise.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

Figure 2:
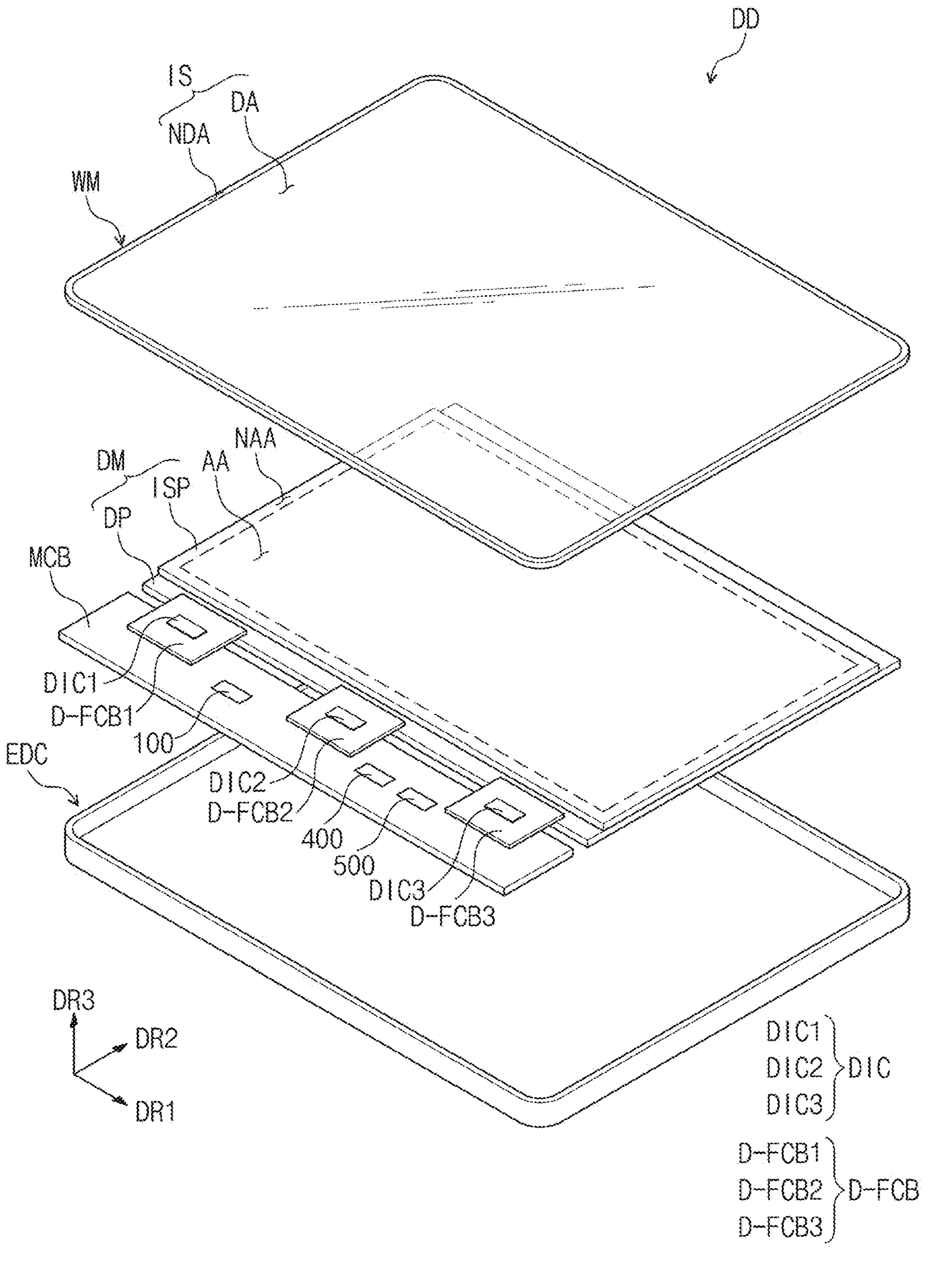
FIG. 2 is an exploded view of a display device according to an embodiment of the present disclosure.

FIG. 1 is a perspective view of a display device DD according to an embodiment of the present disclosure, and FIG. 2 is an exploded view of the display device DD according to an embodiment of the present disclosure.

Referring to FIGS. 1 and 2, the display device DD may be a device that is activated based on an electrical signal. The display device DD according to the present disclosure may be a small and medium-sized display device for a mobile phone, a tablet, an automotive navigation system, or a game console, as well as a large-sized display device for a television or a monitor. The display devices are provided only as an example, and may include any other types of display devices without departing from the concept of the disclosure. The display device DD is in the shape of a rectangle having a long edge (or side) in a first direction DR1 and having a short edge (or side) in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2 so that each of the first direction DR1 and the second direction DR2 faces a third direction DR3. The display surface IS on which the image IM is displayed corresponds to a front surface of the display device DD.

In an embodiment, a front surface (or an upper/top surface) and a rear surface (or a lower/bottom surface) of each member are defined with respect to a direction in which the image IM is displayed. The front surface and the rear surface are opposite to each other in the third direction DR3, and the normal direction of each of the front surface and the rear surface is parallel to the third direction DR3.

A separation distance between the front surface and the rear surface in the third direction DR3 corresponds to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs which are provided from the outside of the display device DD. The display device DD according to an embodiment of the present disclosure may sense an external input of a user, which is applied from the outside. The external input of the user may be one of various types of external inputs such as a part of his/her body, a light, heat, his/her eye, or pressure or may be a combination thereof. In addition, the display device DD may sense the external input of the user applied to the side surface or rear surface of the display device DD based on a structure of the display device DD, and the present disclosure is not limited thereto. As an example of the present disclosure, the external input may include an input that is applied by an input device (e.g., a stylus pen, an active pen, a touch pen, an electronic pen, or an E-pen).

The display surface IS of the display device DD is divided into a display area DA and a non-display area NDA. The display area DA refers to an area in which the image IM is displayed. The user visually perceives the image IM through the display area DA. In an embodiment, the display area DA is illustrated in the shape of a quadrangle whose vertexes are rounded. However, the shape is not limited hereto. In another example, the display area DA may have various shapes such as triangle, circle, or any type of polygonal.

The non-display area NDA is adjacent to the display area DA. In one example, the non-display area NDA surrounds the display area DA. As such, the shape of the display area DA is defined substantially by the non-display area NDA. However, in another example, the non-display area NDA may be disposed adjacent to one side of the display area DA or may be omitted. The display device DD according to an embodiment of the present disclosure includes various embodiments and is not limited to any one embodiment.

As illustrated in FIG. 2, the display device DD includes a display module DM and a window WM disposed on or over the display module DM. The display module DM includes a display panel DP and an input sensing layer ISP.

In this case, the display panel DP may be a light emitting display panel. More particularly, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, etc. In an embodiment, below, the description will be given under the condition that the display panel DP is an organic light emitting display panel.

The display panel DP outputs the image IM, and the output image IM is displayed through the display surface IS.

The input sensing layer ISP is disposed on the display panel DP to sense an external input. The input sensing layer ISP is directly disposed on the display panel DP so that there is no layer interposed between the input sensing layer ISP and the display panel DP. According to an embodiment of the present disclosure, the input sensing layer ISP is formed on the display panel DP in the same process as the display panel DP. For example, in the case where the input sensing layer ISP is directly disposed on the display panel DP, an inner adhesive film (not illustrated) is not disposed between the input sensing layer ISP and the display panel DP. However, the inner adhesive film is disposed between the input sensing layer ISP and the display panel DP. In this case, the input sensing layer ISP is not manufactured in the same process as the display panel DP. For example, the input sensing layer ISP may be manufactured through a process that is independent from the manufacturing process of the display panel DP and may then be fixed on the upper surface of the display panel DP by the inner adhesive film.

The window WM is formed of a transparent material capable of outputting the image IM. For example, the window WM is formed of glass, sapphire, plastic, etc. It is illustrated that the window WM is implemented with a single layer. However, in another example, the window WM may include two or more layers.

Meanwhile, although not illustrated, the non-display area NDA of the display device DD described above corresponds to an area that is defined by printing a material including a given color on one area of the window WM. In this example, the window WM includes a light blocking (or shielding) pattern to define the non-display area NDA. The light blocking pattern which is a colored organic film is formed, for example, in a coating manner.

The window WM is coupled to the display module DM by an adhesive film. In this example, the adhesive film includes an optically clear adhesive (OCA) film. However, in another example, the adhesive film includes a typical adhesive or sticking agent. For example, the adhesive film includes an optically clear resin (OCR) film or a pressure sensitive adhesive (PSA) film.

An anti-reflection layer may be interposed between the window WM and the display module DM. The anti-reflection layer decreases the reflectance of an external light incident from above the window WM. In an embodiment, the anti-reflection layer may include a phase retarder and a polarizer. Each of the phase retarder and the polarizer may be of a film type or a liquid crystal coating type. For example, the polarizer of the film type may include a stretch-type synthetic resin film, and the polarizer of the liquid crystal coating type may include liquid crystals arranged in a given direction. The phase retarder and the polarizer may be implemented with one polarization film.

In an embodiment, the anti-reflection layer includes color filters. The arrangement of the color filters is determined in consideration of colors of lights generated from a plurality of pixels PX (refer to FIG. 3) included in the display panel DP. The anti-reflection layer further includes a light blocking pattern.

The display module DM displays the image IM in accordance with an electrical signal and transmits or receives information about an external input. The display module DM is defined by an effective area AA and a non-effective area NAA. The effective area AA is defined as an area through which the image IM provided from the display module DM is output. In addition, the effective area AA is defined as an area in which the input sensing layer ISP senses an external input applied from the outside.

The non-effective area NAA is disposed adjacent to the effective area AA. For example, the non-effective area NAA surrounds the effective area AA. However, in another example, the non-effective area NAA is defined in various shapes, not limited to any one embodiment. According to an embodiment, the effective area AA of the display module DM corresponds to at least a portion of the display area DA.

The display device DD further includes a main circuit board MCB, flexible circuit films D-FCB, driver chips DIC, a driving controller 100, a first voltage generator 400, and a second voltage generator 500. The main circuit board MCB is connected to the flexible circuit films D-FCB so that the main circuit board MCB is electrically connected to the display panel DP. The flexible circuit films D-FCB are connected to the display panel DP so that the flexible circuit films D-FCB electrically connects the display panel DP to the main circuit board MCB. The main circuit board MCB includes a plurality of driving elements. The plurality of driving elements constitutes a circuit module for driving the display panel DP. The driver chips DIC is mounted on the flexible circuit films D-FCB.

In one embodiment, the flexible circuit films D-FCB includes a first flexible circuit film D-FCB1, a second flexible circuit film D-FCB2, and a third flexible circuit film D-FCB3. The driver chips DIC include a first driver chip DIC1, a second driver chip DIC2, and a third driver chip DIC3. The first to third flexible circuit films D-FCB1, D-FCB2, and D-FCB3 are spaced apart from each other in the first direction DR1 and are connected to the display panel DP to electrically connect the display panel DP and the main circuit board MCB together. The first driver chip DIC1 is mounted on the first flexible circuit film D-FCB1, the second driver chip DIC2 is mounted on the second flexible circuit film D-FCB2, and the third driver chip DIC3 is mounted on the third flexible circuit film D-FCB3. However, in another example, the display panel DP is electrically connected to the main circuit board MCB through one flexible circuit film, and at least one driver chip is mounted on the one flexible circuit film. In addition, the display panel DP is electrically connected to the main circuit board MCB through four or more flexible circuit films, and driver chips are respectively mounted on the flexible circuit films.

A structure in which the first to third driver chips DIC1, DIC2, and DIC3 are mounted on the first to third flexible circuit films D-FCB1, D-FCB2, and D-FCB3, respectively, is illustrated in FIG. 2. However, the present disclosure is not limited thereto. For example, the first to third driver chips DIC1, DIC2, and DIC3 are directly mounted on the display panel DP. In this case, a portion of the display panel DP, on which the first to third driver chips DIC1, DIC2, and DIC3 are mounted, are bendable so that the first to third driver chips DIC1, DIC2, and DIC3 are disposed on the rear surface of the display module DM when the first to third driver chips DIC1, DIC2, and DIC3 are bent. In addition, the first to third driver chips DIC1, DIC2, and DIC3 are directly mounted on the main circuit board MCB.

The input sensing layer ISP is electrically connected to the main circuit board MCB through the flexible circuit films D-FCB. However, the present disclosure is not limited thereto. For example, the display module DM additionally includes a separate flexible circuit film for electrically connecting the input sensing layer ISP and the main circuit board MCB together.

In an embodiment, the driving controller 100, the first voltage generator 400, and the second voltage generator 500 are mounted on the main circuit board MCB. The driving controller 100, the first voltage generator 400, and the second voltage generator 500 are electrically connected to the display panel DP through the main circuit board MCB and the flexible circuit films D-FCB.

The display device DD further includes an outer case EDC which snuggly accommodates the display module DM. The outer case EDC is coupled to the window WM to further define the exterior of the display device DD. The outer case EDC may absorb external shocks and may prevent a foreign material/moisture or the like from being infiltrated into the display module DM so that components accommodated in the outer case EDC are protected. Meanwhile, in this example, the outer case EDC may be provided in the form of a combination of a plurality of accommodating members.

Figure 3:
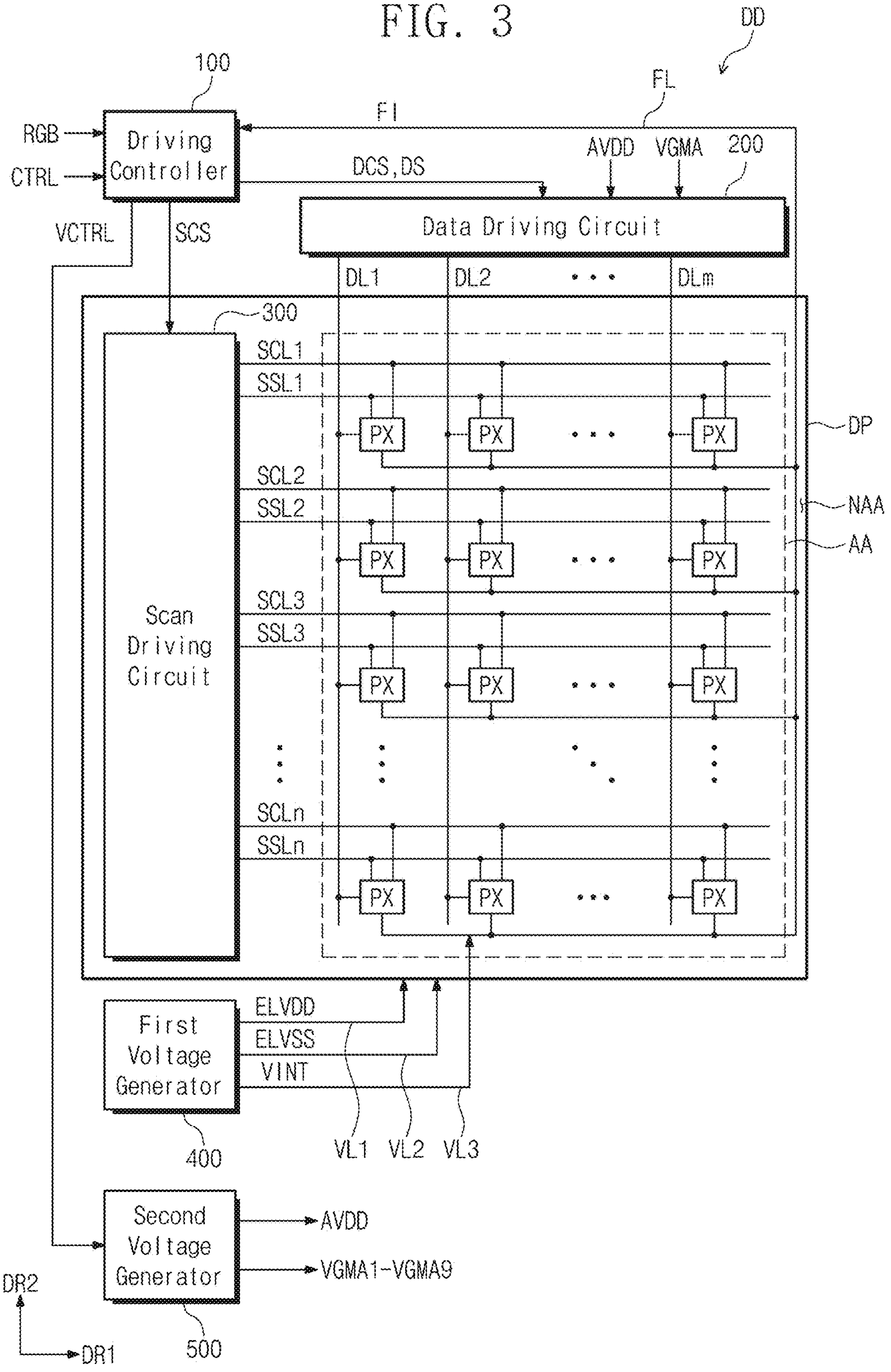
FIG. 3 is a block diagram of a display device according to an embodiment of the present disclosure.

FIG. 3 is a block diagram of a display device according to an embodiment of the present disclosure.

As depicted in FIG. 3, the display device DD includes the driving controller 100, a data driving circuit 200, a scan driving circuit 300, the first voltage generator 400, the second voltage generator 500, and the display panel DP. The driving controller 100, the data driving circuit 200, and the scan driving circuit 300 are referred to as a driving circuit which provides data signals to the pixels PX of the display panel DP. The display panel DP includes first scan lines SCL1 to SCLn, second scan lines SSL1 to SSLn, the data lines DL1 to DLm, and the pixels PX. The first scan lines and the second scan lines are arranged along the second direction DR2, and the data lines are arranged along the first direction DR1.

The driving controller 100 receives an input image signal RGB and a control signal CTRL from an external source. The driving controller 100 converts the input image signal RGB into an image data signal DS and outputs the image signal SD to the data driving circuit 200. The driving controller 100 also outputs a scan control signal SCS to the scan driving circuit 300 and a data control signal DCS to the data driving circuit 200. In an embodiment, the driving controller 100 outputs a voltage control signal VCTRL to the second voltage generator 500 for controlling the second voltage generator 500. In an embodiment, the driving controller 100 may further output a signal to the first voltage generator 400 for controlling the first voltage generator 400.

The data driving circuit 200 receives the data control signal DCS and the image data signal DS from the driving controller 100. The data driving circuit 200 converts the image data signal DS into data signals and then outputs the data signals to a plurality of data lines DL1 to DLm. The data signals are analog voltages corresponding to a gray value of the image data signal DS. The data driving circuit 200 is disposed in the driver chips DIC illustrated in FIG. 2.

The display panel DP is divided into the effective area AA and the non-effective area NAA. The pixels PX are disposed in the effective area AA, and the scan driving circuit 300 is disposed in the non-effective area NAA. The driving controller 100, the data driving circuit 200, the first voltage generator 400, and the second voltage generator 500 are disposed outside of the display panel DP.

The first scan lines SCL1 to SCLn and the second scan lines SSL1 to SSLn extend from the scan driving circuit 300 in the first direction DR1 and are spaced apart from each other in the second direction DR2. The data lines DL1 to DLm extend from the data driving circuit 200 in a direction facing away from the second direction DR2 and are spaced apart from each other in the first direction DR1.

The pixels PX are electrically connected to the first scan lines SCL1 to SCLn, the second scan lines SSL1 to SSLn, and the data lines DL1 to DLm, respectively. For example, some pixels belonging to the first row are connected to the first and second scan lines SCL1 and SSL1. In addition, other pixels belonging to the second row are connected to the first and second scan lines SCL2 and SSL2.

Each of the plurality of pixels PX includes a light emitting element ED (refer to FIG. 4) and a pixel circuit PXC (refer to FIG. 4) for controlling the emission of the light emitting element ED. The pixel circuit PXC includes a plurality of transistors and at least one capacitor. The scan driving circuit 300 includes transistors formed through the same process as the pixel circuit PXC. In an embodiment, the light emitting element ED is an organic light emitting diode. However, n anther example, the light emitting element ED is any type of light emitting devices.

Each of the plurality of pixels PX receives a first driving voltage ELVDD, a second driving voltage ELVSS, and an initialization voltage VINT.

The scan driving circuit 300 receives the scan control signal SCS from the driving controller 100. In response to the scan control signal SCS, the scan driving circuit 300 outputs first scan signals to the first scan lines SCL1 to SCLn and outputs second scan signals to the second scan lines SSL1 to SSLn.

In an embodiment, the scan driving circuit 300 is disposed in the non-effective area NAA disposed outside of the first side of the effective area AA.

In another embodiment, the scan driving circuit 300 includes at least two scan driving circuits which may be respectively disposed on the first side and the second side of the effective area AA. For example, the first scan driving circuit disposed on the first side of the effective area AA provides the first scan signals to the first scan lines SCL1 to SCLn, and the second scan driving circuit disposed on the second side of the effective area AA provides the second scan signals to the second scan lines SSL1 to SSLn.

The first voltage generator 400 generates voltages for operating the display panel DP. In an embodiment, the first voltage generator 400 generates the first driving voltage ELVDD, the second driving voltage ELVSS, and the initialization voltage VINT, which are necessary for the operation of the display panel DP. The first driving voltage ELVDD, the second driving voltage ELVSS and the initialization voltage VINT may be provided to the display panel DP through a first voltage line VL1, a second voltage line VL2, and a third voltage line VL3.

The second voltage generator 500 may generate various voltages for operating the data driving circuit 200 and the scan driving circuit 300. For example, the second voltage generator 500 may generate a power supply voltage AVDD and gamma voltage VGMA, which are necessary for the operation of the data driving circuit 200. In an embodiment, the gamma voltage VGMA may include different voltage levels VGMA1 to VGMA9.

The data driving circuit 200 converts the image data signal DS into data signals based on the power supply voltage AVDD and the gamma voltage VGMA and outputs the data signals to the plurality of data lines DL1 to DLm.

In an embodiment, the driving controller 100 generates the voltage control signal VCTRL for controlling the second voltage generator 500. The voltage control signal VCTRL is generated based on a feedback current signal FI received from the display panel DP through a feedback line FL. A detailed configuration and an operation of the driving controller 100 will be described later.

Figure 4:
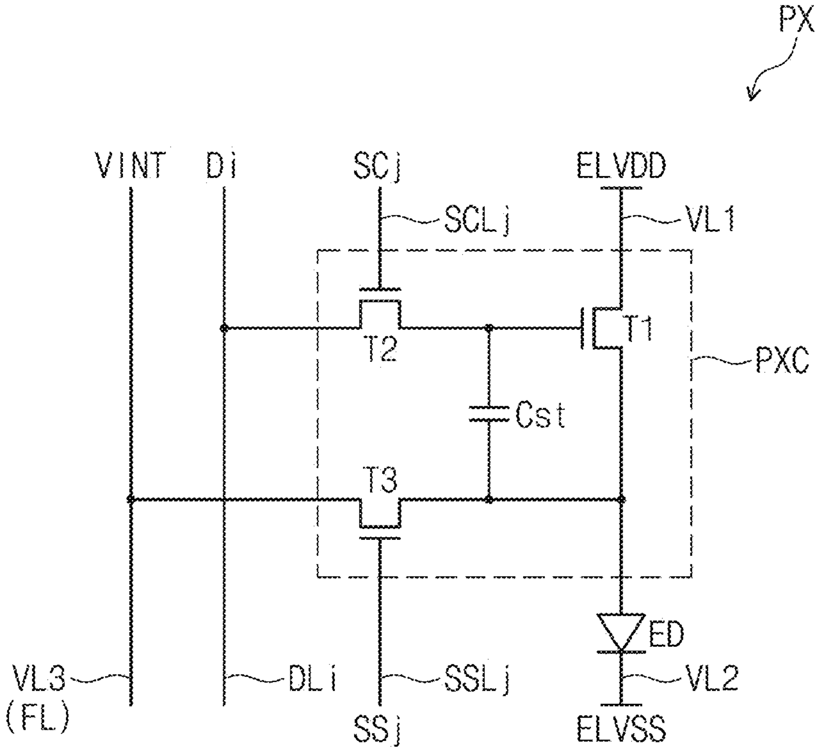
FIG. 4 is an equivalent circuit diagram of a pixel according to an embodiment of the present disclosure.

FIG. 4 is an equivalent circuit diagram of a pixel according to an embodiment of the present disclosure.

As depicted in FIG. 4, an equivalent circuit diagram of a pixel PX is connected to the i-th data line DLi among the data lines DL1 to DLm (refer to FIG. 3), the j-th first scan line SCLj among the first scan lines SCL1 to SCLn (refer to FIG. 3), and the j-th second scan line SSLj among the second scan lines SSL1 to SSLn (refer to FIG. 3).

Each of the pixels PX illustrated in FIG. 3 may have the same circuit configuration as the equivalent circuit diagram of the pixel PX illustrated in FIG. 4. In an embodiment, the pixel includes at least one light emitting element ED and the pixel circuit PXC.

The pixel circuit PXC includes at least one transistor which is electrically connected to the light emitting element ED and provides a current corresponding to a data signal Di transferred from the data line DLi to the light emitting element ED. In an embodiment, the pixel circuit PXC of the pixel PX includes a first transistor T1, a second transistor T2, a third transistor T3, and a capacitor Cst. Each of the first to third transistors T1 to T3 is an N-type transistor by using an oxide semiconductor as a semiconductor layer. However, in another example, each of the first to third transistors T1 to T3 may be a P-type transistor having a low-temperature polycrystalline silicon (LTPS) semiconductor layer. In an embodiment, at least one of the first to third transistors T1 to T3 may be an N-type transistor, and the others thereof may be P-type transistors. In addition, a circuit configuration of each pixel is not limited to FIG. 4, and thus, the configuration of the pixel circuit PXC may be modified and implemented.

Referring to FIG. 4, the first scan line SCLj transfers a first scan signal SCj, and the second scan line SSLj transfers a second scan signal SSj. The data line DLi transfers the data signal Di. The data signal Di has a voltage level corresponding to the input image signal RGB which is input to the display device DD (refer to FIG. 3).

The first voltage line VL1 and the third voltage line VL3 transfer the first driving voltage ELVDD and the initialization voltage VINT to the pixel circuit PXC, and the second voltage line VL2 transfers the second driving voltage ELVSS to a cathode (or a second terminal) of the light emitting element ED.

The first transistor T1 includes a first electrode connected to the first voltage line VL1 to receive the first driving voltage ELVDD, a second electrode electrically connected to an anode (or a first terminal) of the light emitting element ED, and a gate electrode connected to a first end of the capacitor Cst and the second transistor T2. The first transistor T1 may supply a driving current to the light emitting element ED in response to the data signal Di transferred through the data line DLi based on a switching operation of the second transistor T2.

The second transistor T2 includes a first electrode connected to the data line DLi to receive the data signal Di, a second electrode connected to the gate electrode of the first transistor T1 and the first end of the capacitor Cst, and a gate electrode connected to the first scan line SCLj to receive the first scan signal SCj. The second transistor T2 may be turned on based on the first scan signal SCj transferred through the first scan line SCLj and may transfer the data signal Di from the data line DLi to the gate electrode of the first transistor T1.

The third transistor T3 includes a first electrode connected to the third voltage line VL3, a second electrode connected to the anode of the light emitting element ED, and a gate electrode connected to the second scan line SSLj to receive the second signal SSj. The third transistor T3 may be turned on based on the second scan signal SSj transferred through the second scan line SSLj and may transfer the initialization voltage VINT to the anode of the light emitting element ED.

The first end of the capacitor Cst is connected to the gate electrode of the first transistor T1, and a second end of the capacitor Cst is connected to the second electrode of the first transistor T1 and the second electrode of the third transistor T3.

In an embodiment, the pixel PX may operate in an emission mode and a current sensing mode. In the emission mode, when the third transistor T3 is turned on, the initialization voltage VINT from the third voltage line VL3 may be transferred to the anode of the light emitting element ED.

In the current sensing mode, when the third transistor T3 is turned on, the voltage of the anode of the light emitting element ED corresponding to the data signal Di may be transferred to the third voltage line VL3. In an embodiment, the third voltage line VL3 may be the feedback line FL. An example in which the third voltage line VL3 and the feedback line FL are implemented with the same line is illustrated in FIG. 4. In an embodiment, the third voltage line VL3 and the feedback line FL may be implemented with different wirings.

Figure 5:
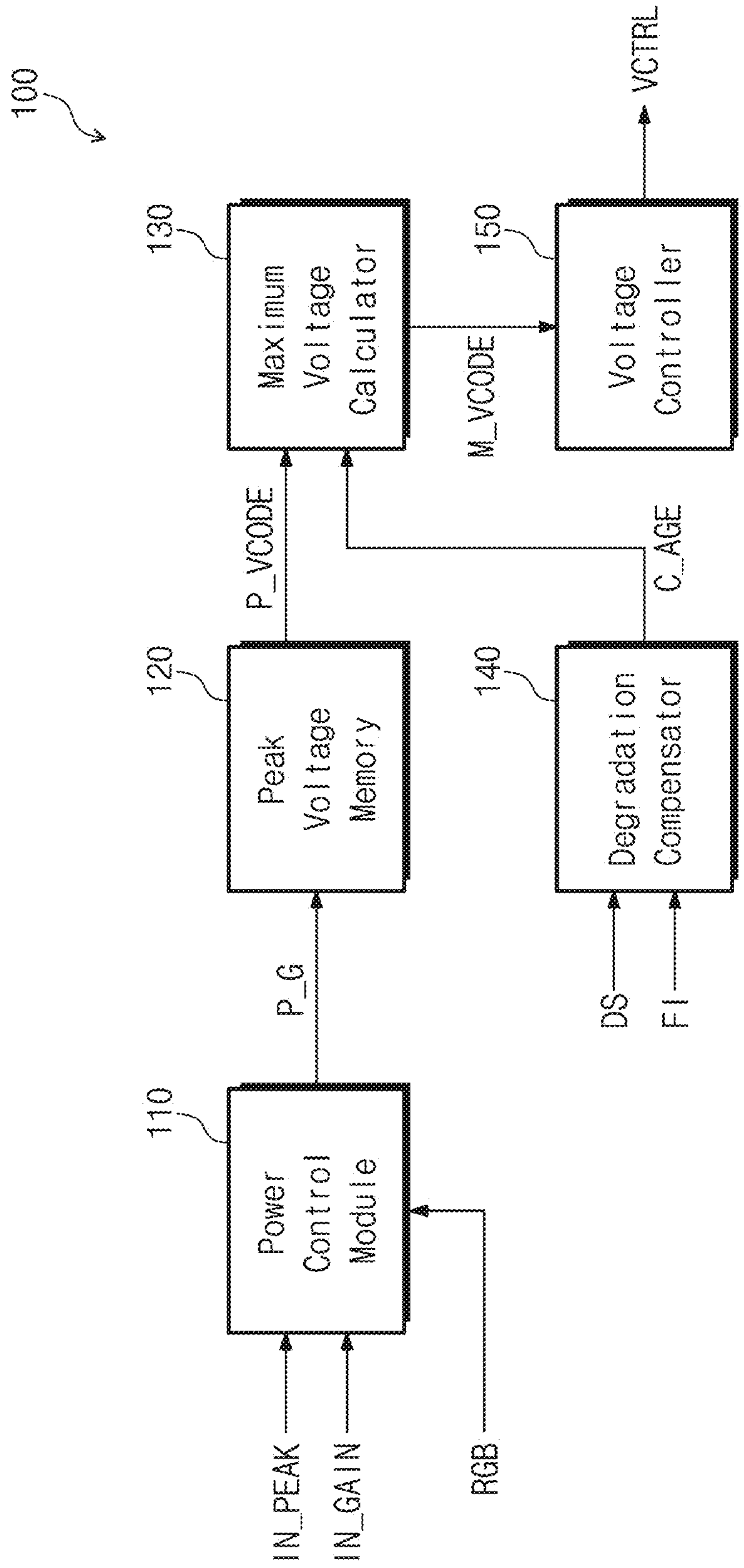
FIG. 5 is a block diagram illustrating a configuration of a driving controller.

FIG. 5 is a block diagram illustrating a configuration of the driving controller 100.

In this example, components associated with a voltage control function from among functions of the driving controller 100 are illustrated in FIG. 5. In addition to components illustrated in FIG. 5, the driving controller 100 may further include various components, for example, components for outputting the image data signal DS and components for outputting the data control signal DCS.

The driving controller 100 operates in a normal mode and a power-saving mode. During the power-saving mode, the driving controller 100 generates the voltage control signal VCTRL for changing voltage levels of the gamma voltages VGMA1 to VGMA9 (refer to FIG. 3) in response to the input image signal RGB, a peak signal IN_PEAK, and a gain signal IN_GAIN.

As depicted in FIG. 5, the driving controller 100 includes a power control module 110, a peak voltage memory 120, a maximum voltage calculator 130, a degradation compensator 140, and a voltage controller 150.

The power control module 110 may be called a net power control (NPC) block. The power control module 110 may adjust the brightness (or luminance) of the display panel DP (refer to FIG. 3) based on the load of the input image signal RGB. For example, when the load of the input image signal RGB is greater than a reference value (i.e., threshold value), the power control module 110 decreases the brightness of the display panel DP, and when the load of the input image signal RGB is less than a reference value (i.e., threshold value), the power control module 110 increases the brightness of the display panel DP.

In an embodiment, the power control module 110 generates a peak gray signal P_G in response to the peak signal IN_PEAK and the gain signal IN_GAIN. In an embodiment, the peak signal IN_PEAK and the gain signal IN_GAIN are provided from an external source (e.g., an external device such as a main processor, a graphics processor, or a host processor). In an embodiment, the peak signal IN_PEAK and the gain signal IN_GAIN are values which are stored in a memory, a register, etc. in the driving controller 100.

The peak voltage memory 120 stores a peak voltage code P_VCODE corresponding to the peak gray signal P_G.

The degradation compensator 140 generates a degradation compensation value C_AGE based on the image data signal DS, the feedback current signal FI, and an operating time of the display device DD.

The maximum voltage calculator 130 generates a maximum voltage code M_VCODE based on the peak voltage code P_VCODE from the peak voltage memory 120 and the degradation compensation value C_AGE from the degradation compensator 140.

The voltage controller 150 generates the voltage control signal VCTRL corresponding to the maximum voltage code M_VCODE from the maximum voltage calculator 130. The voltage control signal VCTRL is a signal for setting voltage levels of the power supply voltage AVDD and the gamma voltages VGMA1 to VGMA9.

The second voltage generator 500 illustrated in FIG. 3 generates the power supply voltage AVDD and the gamma voltages VGMA1 to VGMA9 whose levels correspond to the voltage control signal VCTRL.

Figure 6A:
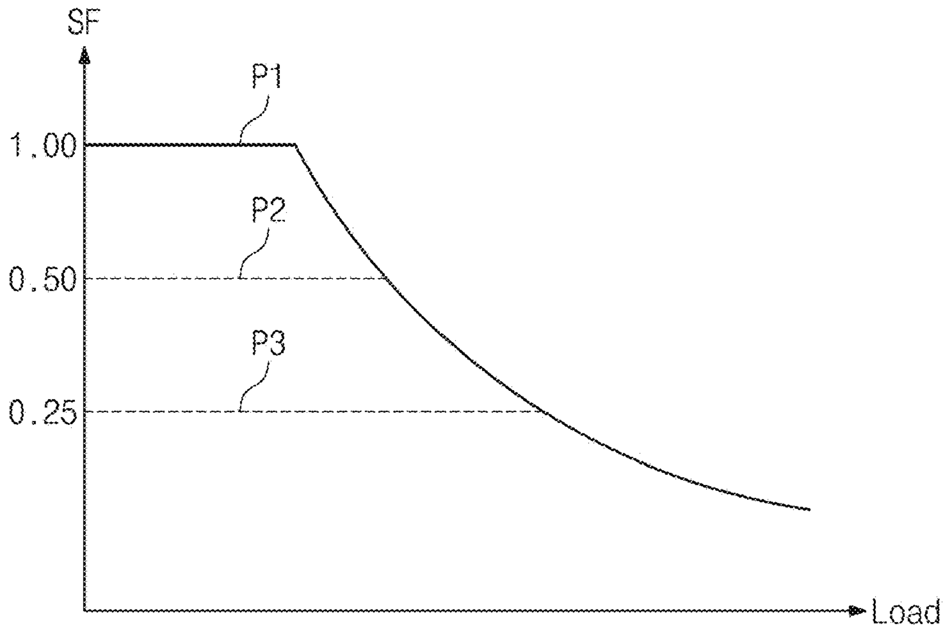
FIGS. 6A and 6B are diagrams illustrating an operation of a power control module according to a peak signal.
Figure 6B:
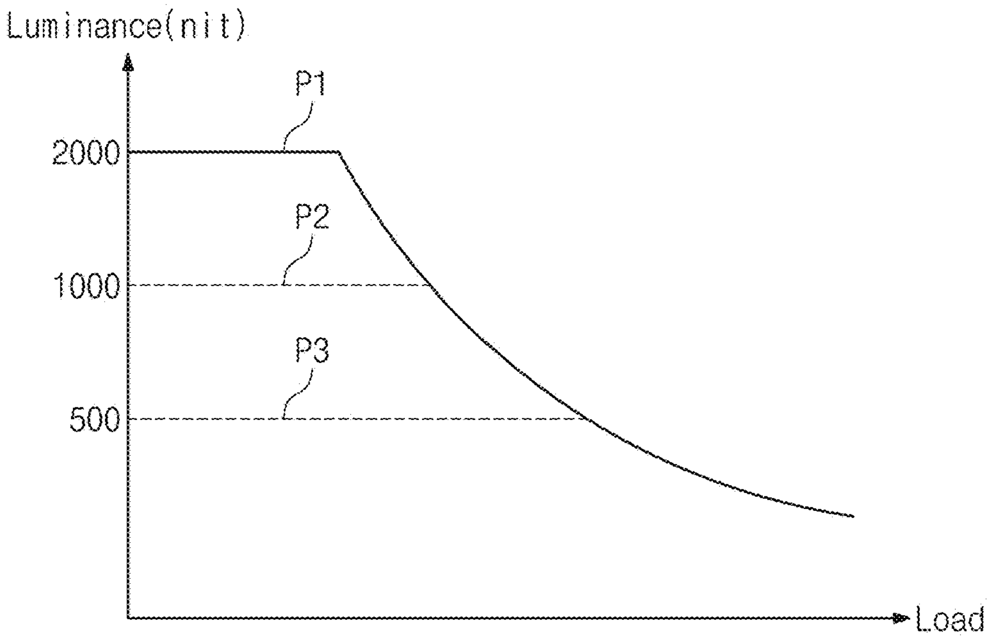

FIGS. 6A and 6B are diagrams illustrating an operation of the power control module 110 according to the peak signal IN_PEAK.

FIG. 6A is a diagram illustrating the relationship between a load and a scale factor SF by the power control module 110.

As referring to FIG. 6A, to maintain or decrease the grayscale of the image data signal DS (refer to FIG. 3) corresponding to the input image signal RGB, the power control module 110 may calculate the scale factor SF according to a load.

In an embodiment, the scale factor SF may be differently set based on the load. In an embodiment, the load may be calculated based on a gray level of the input image signal RGB. For example, the load may be calculated according to a characteristic (i.e., a gray level) of the input image signal RGB. The power control module 110 calculates the load based on the input image signal RGB provided from an external source.

For example, when the load is less than the reference value (i.e., threshold value), the maximum value of the scale factor SF may be "1". Also, when the load is greater than or equal to the reference value (i.e., threshold value), the scale factor SF becomes smaller.

For example, when the scale factor SF is "1", the grayscale of the image data signal DS may be identical to the grayscale of the input image signal RGB. When the scale factor SF is 0.5, the grayscale of the image data signal DS may decrease to half of the grayscale of the input image signal RGB.

When the peak signal IN_PEAK has a first peak value P1, the power control module 110 may set the maximum value of the scale factor SF to "1". When the peak signal IN_PEAK has a second peak value P2, the power control module 110 may set the maximum value of the scale factor SF to 0.5. When the peak signal IN_PEAK has a third peak value P3, the power control module 110 may set the maximum value of the scale factor SF to 0.25. In an embodiment, the first peak value P1 is greater than the second peak value P2, the second peak value P2 is greater than the third peak value P3, and the first peak value P2 is greater than the third peak value P3.

For example, as the peak value of the peak signal IN_PEAK decreases, a peak gray level of the image data signal DS may decrease accordingly.

FIG. 6B is a diagram illustrating the relationship between a load and luminance by the power control module 110.

As referring to FIGS. 6A and 6B, because the peak gray level of the image data signal DS is determined based on the peak value of the peak signal IN_PEAK, the peak luminance of an image which is displayed in the display panel DP (refer to FIG. 3) may be determined based on the peak value of the peak signal IN_PEAK.

When the peak signal IN_PEAK has the first peak value P1, the peak luminance of the image which is displayed in the display panel DP is about 2000 nits. When the peak signal IN_PEAK has the second peak value P2, the peak luminance of the image which is displayed in the display panel DP may be about 1000 nits. When the peak signal IN_PEAK has the third peak value P3, the peak luminance of the image which is displayed in the display panel DP may be about 500 nits. For example, the second peak value P2 is about the half of the first peak value P1, and the third peak value P3 is the half of the second peak value P2.

As the peak value of the peak signal IN_PEAK decreases, the peak luminance of the image which is displayed in the display panel DP (refer to FIG. 3) may decrease.

Figure 7A:
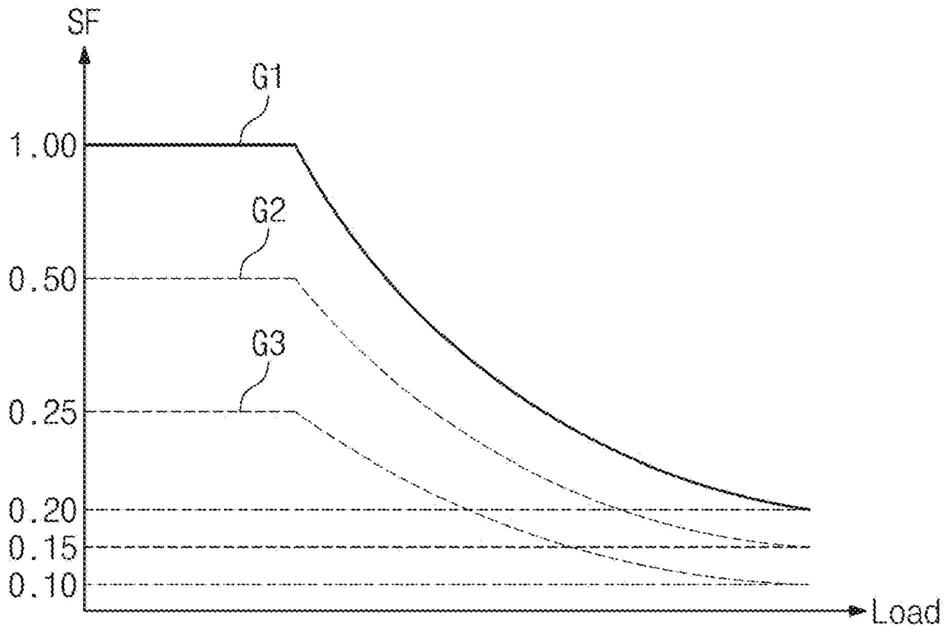
FIGS. 7A and 7B are diagrams illustrating an operation of a power control module according to a gain signal.
Figure 7B:
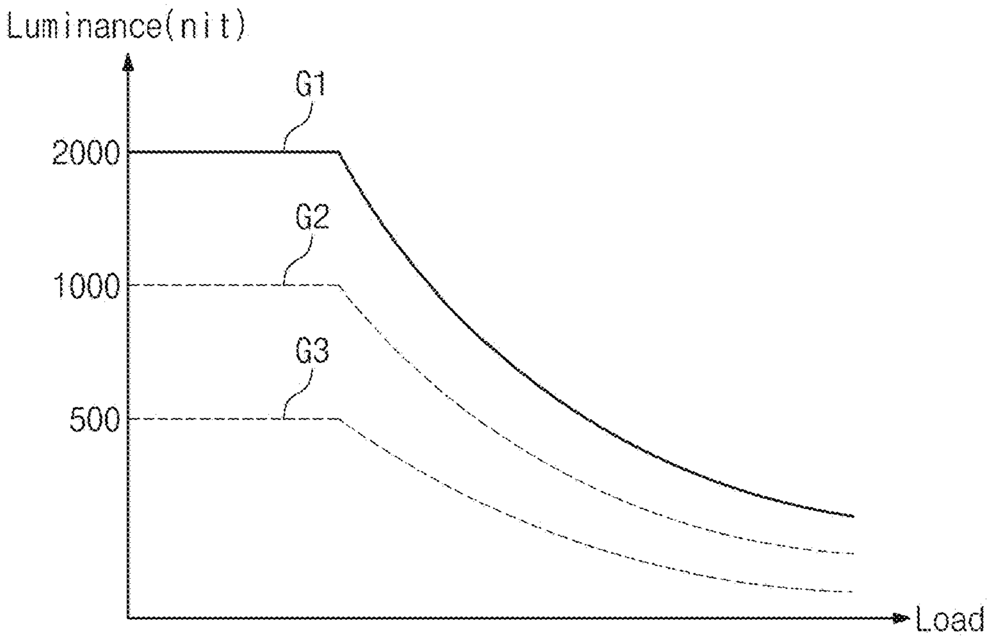

FIGS. 7A and 7B are diagrams illustrating an operation of the power control module 110 in accordance with the gain signal IN_GAIN.

More particularly, FIG. 7A is a diagram illustrating the relationship between a load and the scale factor SF by the power control module 110.

Referring to FIG. 7A, to maintain or decrease the grayscale of the image data signal DS (refer to FIG. 3) corresponding to the input image signal RGB, the power control module 110 may calculate the scale factor SF based on a load.

In an embodiment, the value of the scale factor SF may be differently set based on the load. In an embodiment, the load may be calculated based on a gray level of the input image signal RGB. For example, the load may be calculated based on one of characteristics (i.e., a gray level) of the input image signal RGB. Thus, the power control module 110 may calculate the load based on the input image signal RGB. In this case, the power control module 110 may calculate the scale factor SF based on the load which is based on the input image signal RGB.

For example, when the load is smaller than the reference value (i.e., threshold value), the maximum value of the scale factor SF may be "1". In addition, when the load is greater than or equal to the reference value, the scale factor SF becomes smaller.

For example, when the scale factor SF is 1, the grayscale of the image data signal DS may be identical to the grayscale of the input image signal RGB. When the scale factor SF is 0.5, the grayscale of the image data signal DS may decrease to half of the grayscale of the input image signal RGB.

When the gain signal IN_GAIN has a first gain value G1, the power control module 110 may set the maximum value of the scale factor SF to "1". When the gain signal IN_GAIN has a second gain value G2, the power control module 110 may set the maximum value of the scale factor SF to 0.5. When the gain signal IN_GAIN has a third gain value G3, the power control module 110 may set the maximum value of the scale factor SF to 0.25. In an embodiment, the first gain value G1 is greater than the second gain value G2, and the second gain value G2 is greater than the third gain value G3. For example, the maximum value of the scale factor SF of the second gain value G2 is about half of that of the first gain value G1, and the maximum value of the scale factor SF of the third gain value G3 is about half of that of the second gain value G2.

In this case, as the gain value of the gain signal IN_GAIN decreases, a peak gray level of the image data signal DS may decrease.

In the example illustrated in FIG. 6A, the power control module 110 adjusts the maximum value of the scale factor SF based on the peak value of the peak signal IN_PEAK. In the example illustrated in FIG. 7A, when the load is smaller than the reference value (i.e., threshold value), the power control module 110 adjusts the maximum value of the scale factor SF based on the gain value of the gain signal IN_GAIN. In addition, when the load is greater than the reference value (i.e., threshold value), the power control module 110 gradually decreases the scale factor SF based on the gain value of the gain signal IN_GAIN.

As such, the minimum value of the scale factor SF may also vary based on the gain value of the gain signal IN_GAIN. In this case, when the gain signal IN_GAIN has the first gain value G1, the minimum value of the scale factor SF is 0.2; when the gain signal IN_GAIN has the second gain value G2, the minimum value of the scale factor SF is 0.15; when the gain signal IN_GAIN has the third gain value G3, the minimum value of the scale factor SF is 0.1. Similar to the maximum value of the scale factor SF, the minimum value of the scale factor SF of the second gain value G2 is less than that of the first gain value G1, and the minimum value of the scale factor SF of the third gain value G3 is less than that of the second gain value G2.

FIG. 7B is a diagram illustrating the relationship between a load and luminance by the power control module 110.

As depicted in FIGS. 7A and 7B, because the gray level of the image data signal DS is determined based on the gain value of the gain signal IN_GAIN, the luminance of an image which is displayed in the display panel DP (refer to FIG. 3) may be determined based on the gain value of the gain signal IN_GAIN accordingly.

In this case, when the gain signal IN_GAIN has the first gain value G1, the peak luminance of the image which is displayed in the display panel DP may be about 2000 nits. When the gain signal IN_GAIN has the second gain value G2, the peak luminance of the image which is displayed in the display panel DP may be about 1000 nits. When the gain signal IN_GAIN has the third gain value G3, the peak luminance of the image which is displayed in the display panel DP may be about 500 nits. Both the peak value and the whole luminance of the image displayed in the display panel DP (refer to FIG. 3) may decrease based on the gain values of the gain signal IN_GAIN.

In this case, when the gain value of the gain signal IN_GAIN becomes smaller in a state where the input image signal RGB indicates a full white (i.e., the load is great), the luminance of the image which is displayed in the display panel DP (refer to FIG. 3) may become lower.

As described with references of FIGS. 6A, 6B, 7A, and 7B, the power control module 110 may output the peak gray signal P_G in response to the peak signal IN_PEAK and the gain signal IN_GAIN. The peak gray signal P_G may correspond to the maximum gray level of the image data signal DS corresponding to the input image signal RGB. In this case, the maximum gray level of the image data signal DS may be determined by both of the peak signal IN_PEAK and the gain signal IN_GAIN.

Also, the power control module 110 may decrease the luminance of the image displayed in the display panel DP in response to both of the peak signal IN_PEAK and the gain signal IN_GAIN.

The amount of current flowing through the light emitting element ED (refer to FIG. 4) in the pixel PX (refer to FIG. 4) may be adjusted by the operation of the power control module 110 described above. As a result, the power consumption of the display panel DP may be reduced.

Referring back to FIG. 5, the driving controller 100 according to an embodiment of the present disclosure may perform a control operation to reduce the power consumption of the driving circuit. In detail, the driving controller 100 may perform the control operation to reduce the power consumption of the data driving circuit 200 (refer to FIG. 3) and the second voltage generator 500 (refer to FIG. 3).

Figure 8A:
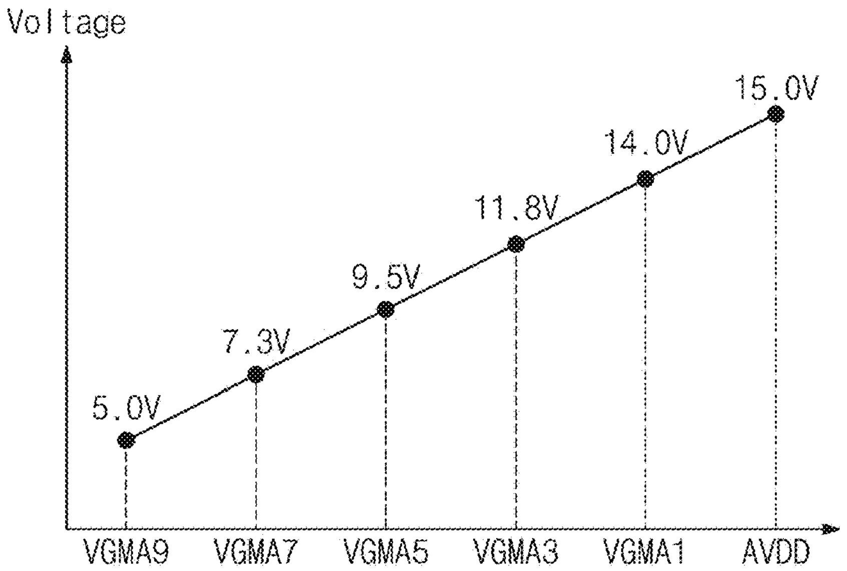
FIG. 8A is a diagram illustrating a power supply voltage and gamma voltages generated by a second voltage generator in a normal mode.

FIG. 8A is a diagram illustrating the power supply voltage AVDD and the gamma voltages VGMA1, VGMA3, VGMA5, VGMA7, and VGMA9 generated by the second voltage generator 500 in the normal mode. In this case, the diagram compares voltage levels between the power supply voltage AVDD and each of the gamma voltages VGMA1, VGMA3, VGMA5, VGMA7, and VGMA9.

Figure 8B:
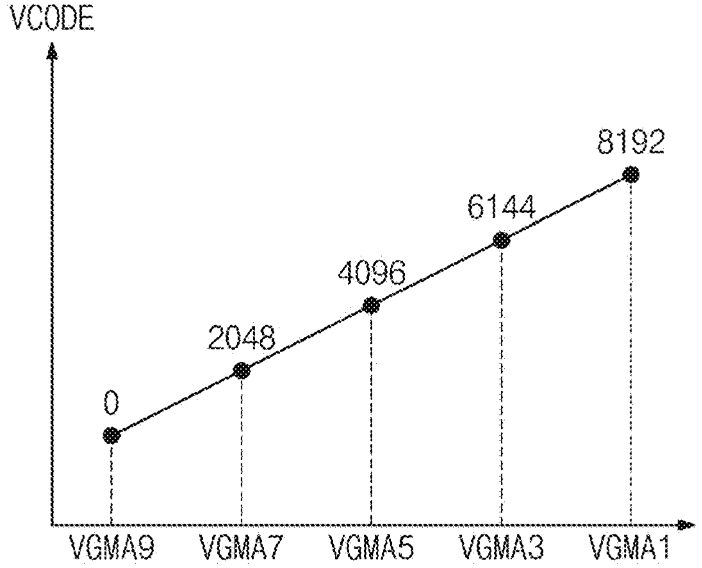
FIG. 8B is a diagram illustrating a voltage code corresponding to each of gamma voltages in a normal mode.

FIG. 8B is a diagram illustrating a voltage code corresponding to each of the gamma voltages VGMA1, VGMA3, VGMA5, VGMA7, and VGMA9 in the normal mode.

Referring to FIGS. 8A and 8B, voltage levels of the gamma voltages VGMA1, VGMA3, VGMA5, VGMA7, and VGMA9 may be lower than the power supply voltage AVDD and may be different from each other. For example, the last gamma voltage VGMA9 has smaller voltage level than the first gamma voltage VGMA1, and the power supply voltage AVDD has larger voltage level than the first gamma voltage VGMA1.

The voltage levels of the power supply voltage AVDD and the gamma voltages VGMA1, VGMA3, VGMA5, VGMA7, and VGMA9 and the voltage codes corresponding to the gamma voltages VGMA1, VGMA3, VGMA5, VGMA7, and VGMA9 are illustrated in FIGS. 8A and 8B as an example, but the present disclosure is not limited thereto.

In addition, the number of gamma voltages (e.g., VGMA1 to VGMA9) generated by the second voltage generator 500 illustrated in FIG. 3 may be variously changed or modified. In this case, the number of gamma voltages are VGMA1, VGMA3, VGMA5, VGMA7, and VGMA9. In another case, the number of the gamma voltage may be less or more than five.

Figure 9A:
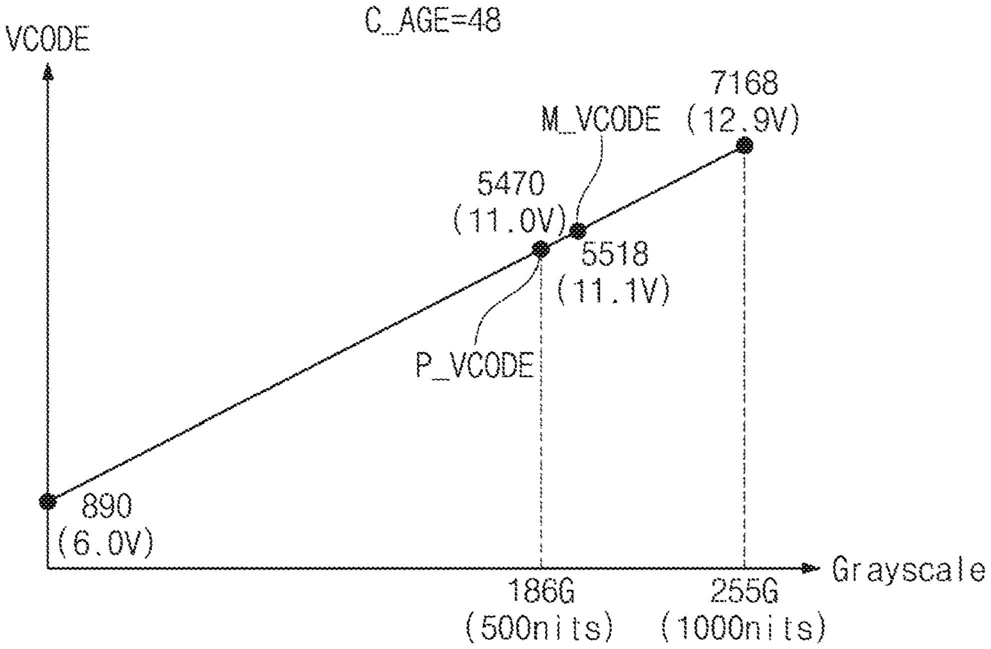
FIG. 9A illustrates a peak voltage code and a maximum voltage code when peak luminance is 500 nits.

FIG. 9A illustrates the peak voltage code P_VCODE and the maximum voltage code M_VCODE when the peak luminance is 500 nits.

Figure 9B:
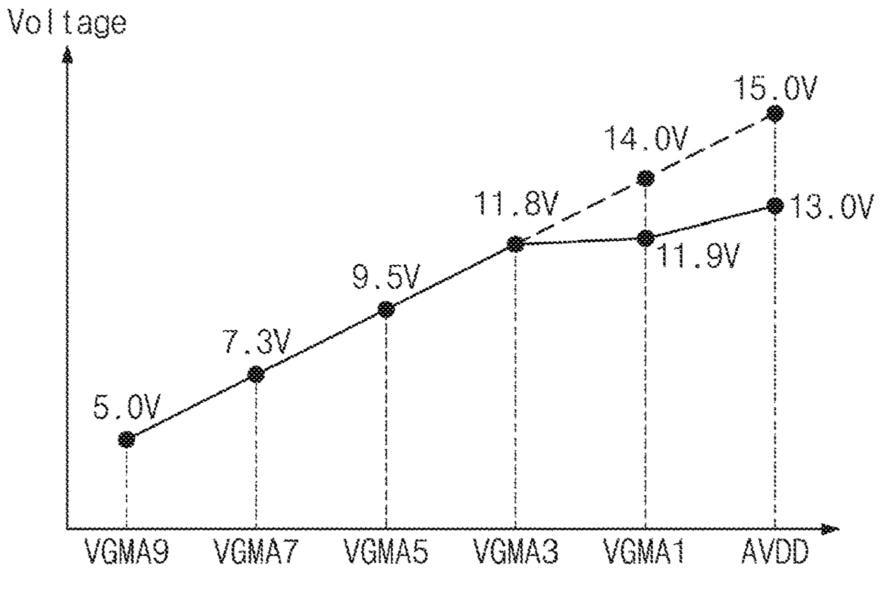
FIG. 9B is a diagram illustrating a power supply voltage and gamma voltages according to a maximum voltage code illustrated in FIG. 9A in a power-saving mode.

FIG. 9B is a diagram illustrating the power supply voltage AVDD and the gamma voltages VGMA1, VGMA3, VGMA5, VGMA7, and VGMA9 according to the maximum voltage code M_VCODE illustrated in FIG. 9A in the power-saving mode.

Referring to FIGS. 5, 9A, and 9B, it is assumed that the luminance of an image displayed in the display panel DP (refer to FIG. 3) when the gray level of the image data signal DS is 255G is about 1000 nits and the luminance of an image displayed in the display panel DP when the gray level of the image data signal DS is 186G is about 500 nits (refer to FIG. 9A).

In this case, the peak voltage code P_VCODE corresponds to the peak gray signal P_G. As described above, the peak gray signal P_G may correspond to the maximum gray level of the image data signal DS, which is determined by both of the peak signal IN_PEAK and the gain signal IN_GAIN.

For example, the peak voltage code P_VCODE is a voltage code corresponding to the maximum luminance (e.g., 500 nits) of the image data signal DS to be displayed in the display panel DP (refer to FIG. 3).

The light emitting element ED in the pixel PX (refer to FIG. 4) may be degraded based on the operating time and the gray level of the data signal Di. The degradation compensator 140 generates the degradation compensation value C_AGE based on the operating time of the display device DD, the image data signal DS, and the feedback current signal FI.

In an embodiment, the degradation compensator 140 may calculate the degradation compensation value C_AGE further in consideration of various factors (e.g., an operating temperature), in addition to the operating time of the display device DD, the image data signal DS, and the feedback current signal FI. In an embodiment, without the image data signal DS and the feedback current signal FI, the degradation compensator 140 may count the operating time of the display device DD to generate the output of the degradation compensation value C_AGE.

In an embodiment, the maximum voltage calculator 130 may generate a result of adding the peak voltage code P_VCODE and the degradation compensation value C_AGE as the maximum voltage code M_VCODE.

In the example illustrated in FIG. 9A, at the degradation compensation value C_AGE is at 48, when the peak voltage code P_VCODE is "5470", the maximum voltage calculator 130 generates the output of "5518" as the maximum voltage code M_VCODE.

Correspondingly in this example, when the maximum voltage code M_VCODE is "5518", the voltage controller 150 may generate outputs of the power supply voltage AVDD and the gamma voltages VGMA1, VGMA3, VGMA5, VGMA7, and VGMA9 as illustrated in FIG. 9B.

As depicted in FIG. 9A, the peak voltage code P_VCODE of "5470" may correspond to 11.0 V, and the maximum voltage code M_VCODE of "5518" may correspond to 11.1 V.

In an embodiment, when the maximum voltage code M_VCODE is equal to or smaller than the reference value (i.e., threshold value), the voltage controller 150 may operate in the power-saving mode. In this example, when the reference value has a voltage code of "7168" which is corresponding to the 255 gray level (255G) and the maximum voltage code M_VCODE is "5519", then the voltage controller 150 may operate in the power-saving mode.

In the power-saving mode, the voltage controller 150 maintains the voltage levels of the gamma voltages VGMA9, VGMA7, and VGMA5, all of which are lower than the voltage level of 11.1 V corresponding to the maximum voltage code M_VCODE, to be identical to the normal mode. In addition, the voltage controller 150 maintains the gamma voltage VGMA3 whose voltage level is higher than the voltage level of 11.1 V corresponding to the maximum voltage code M_VCODE and is the closest to the voltage level of 11.1 V, to be identical to the normal mode. In an embodiment, the gamma voltage VGMA3 whose voltage level is higher than the voltage level corresponding to the maximum voltage code M_VCODE (voltage level of 11.1 V) and is the closest to the voltage level corresponding to the maximum voltage code M_VCODE may be called the maximum gamma voltage.

In the power-saving mode, the voltage controller 150 may change the voltage levels of the gamma voltage VGMA1 and the power supply voltage AVDD, which are greater than the gamma voltage VGMA3 being the maximum gamma voltage, to 11.9 V and 13.0 V, respectively. The voltage controller 150 outputs the voltage control signal VCTRL corresponding to the voltage levels of the power supply voltage AVDD and the gamma voltages VGMA1, VGMA3, VGMA5, VGMA7, and VGMA9.

In the power-saving mode, when the peak luminance is 500 nits, the gamma voltage VGMA1 which is required to generate a grayscale voltage to obtain luminance higher than the peak luminance is not used in the data driving circuit 200. Accordingly, the driving controller 100 may decrease the voltage level of the gamma voltage VGMA1 being unnecessary and also decreases the voltage level of the power supply voltage AVDD to be appropriate for the gamma voltage VGMA1 of the decreased voltage level. In this case, both of the power consumption of the second voltage generator 500 (refer to FIG. 3) and the data driving circuit 200 (refer to FIG. 3) are reduced.

Figure 10A:
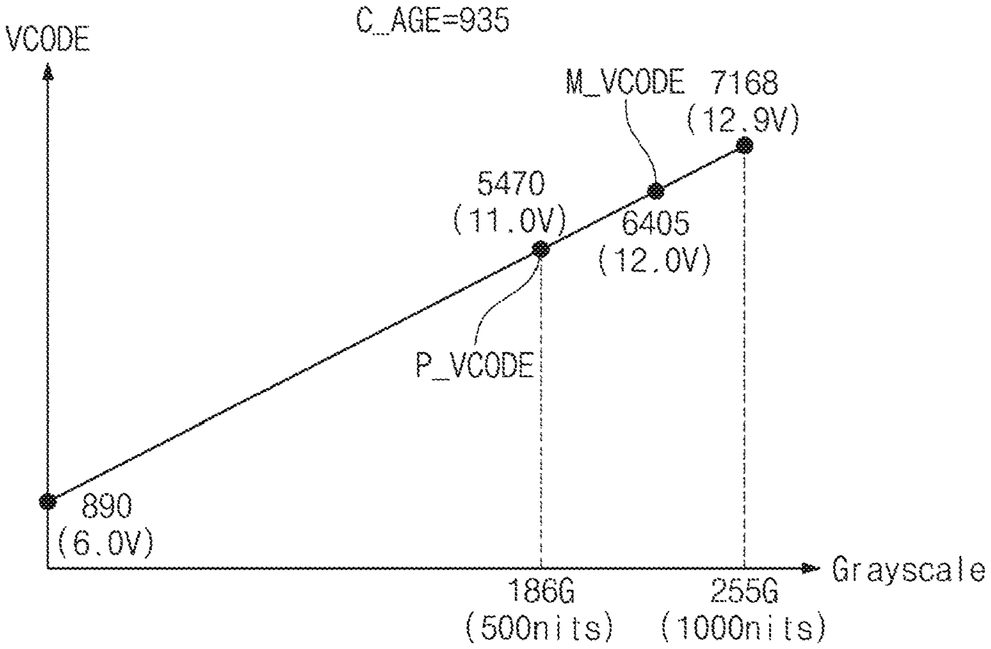
FIG. 10A illustrates a peak voltage code and a maximum voltage code when peak luminance is 500 nits.

FIG. 10A illustrates the peak voltage code P_VCODE and the maximum voltage code M_VCODE when the peak luminance is 500 nits.

Figure 10B:
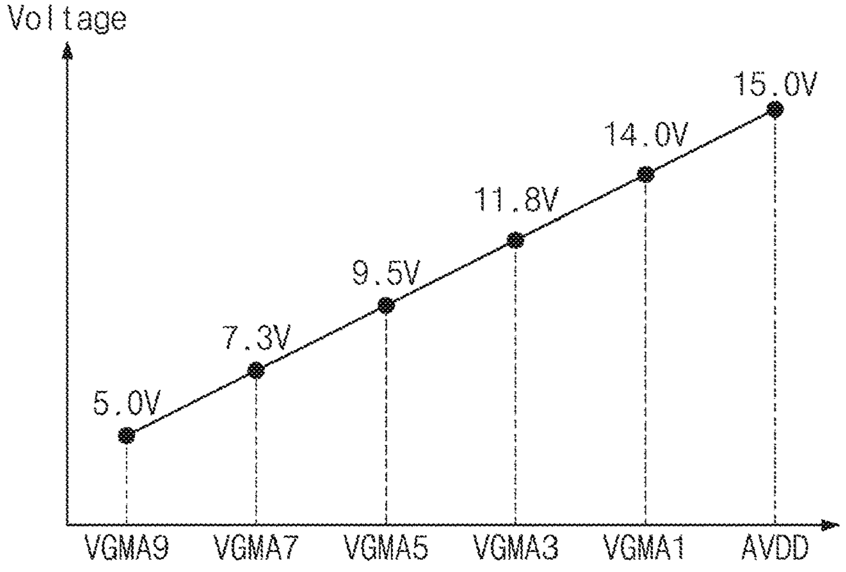
FIG. 10B is a diagram illustrating a power supply voltage and gamma voltages according to a maximum voltage code illustrated in FIG. 10A in a power-saving mode.

FIG. 10B is a diagram illustrating the power supply voltage AVDD and the gamma voltages VGMA1, VGMA3, VGMA5, VGMA7, and VGMA9 according to the maximum voltage code M_VCODE illustrated in FIG. 10A in the power-saving mode. In this case, the diagram compares voltage levels between the power supply voltage AVDD and each of the gamma voltages VGMA1, VGMA3, VGMA5, VGMA7, and VGMA9.

The peak voltage code P_VCODE illustrated in FIG. 10A is "5470" which is the same as the peak voltage code P_VCODE illustrated in FIG. 9A. However, in FIG. 10A, the degradation compensation value C_AGE increases to "935" from "48".

Referring to FIGS. 5, 10A, and 10B, for the degradation compensation value C_AGE of "935", when the peak voltage code P_VCODE is set to "5470", the maximum voltage calculator 130 generates the output of "6405" as the maximum voltage code M_VCODE. In an embodiment, the output value of "6405" which is the maximum voltage code M_VCODE may correspond to 12.0 V.

In the power-saving mode, the voltage controller 150 maintains the gamma voltages VGMA9, VGMA7, VGMA5, and VGAM3, all of which have voltage levels lower than the voltage level of 12.0 V corresponding to the maximum voltage code M_VCODE, to be identical to the normal mode. In addition, the voltage controller 150 maintains the gamma voltage VGMA1 whose voltage level is higher than the voltage level of 12.0 V corresponding to the maximum voltage code M_VCODE and is the closest to the voltage level of 12.0 V, to be identical to the normal mode.

In the example illustrated in FIG. 10B, because the gamma voltage VGMA1 is maintained to be identical to the normal mode, the power supply voltage AVDD has to be maintained to be identical to the normal mode.

As described above, the light emitting element ED in the pixel PX (refer to FIG. 4) may be degraded based on the operating time. For example, the gray level of the image data signal DS for displaying an image of given luminance when the operating time becomes longer has to become higher than when the operating time becomes shorter. Thus, in this case, the gray level of the image data signal DS for displaying an image of given luminance may depend on the operating time.

As understood from FIGS. 9A and 10A, when the degree of degradation of the light emitting element ED increases, the degradation compensation value C_AGE may increase. In this case, the maximum voltage code M_VCODE may become greater even though the peak voltage codes P_VCODE for both cases are equally maintained.

Figure 11A:
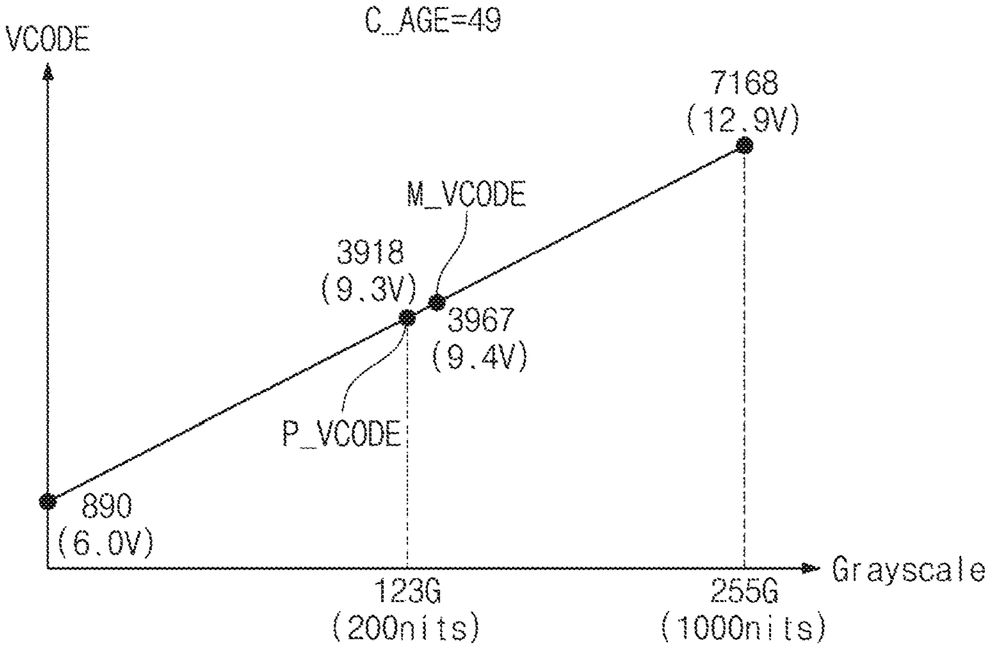
FIG. 11A illustrates a peak voltage code and a maximum voltage code when peak luminance is 200 nits.

FIG. 11A illustrates the peak voltage code P_VCODE and the maximum voltage code M_VCODE when the peak luminance is 200 nits.

Figure 11B:
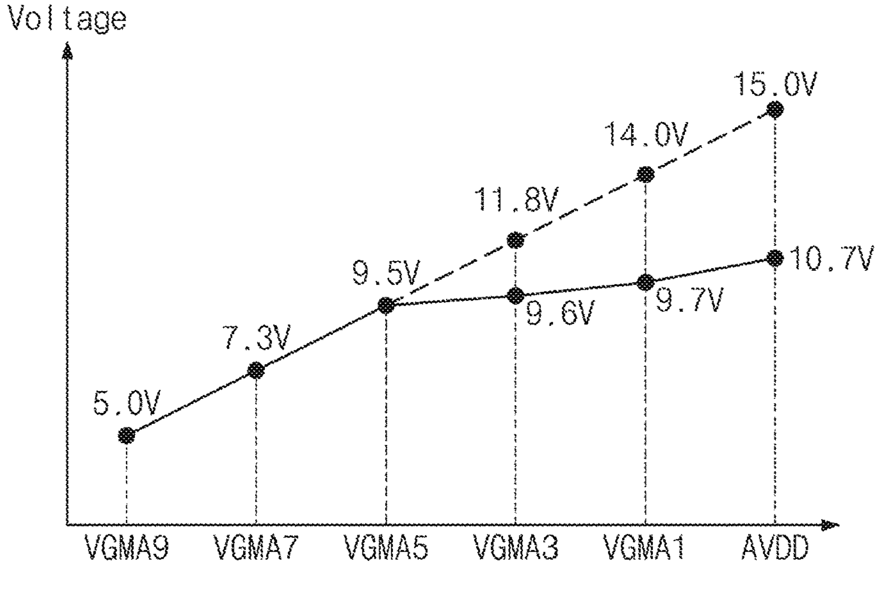
FIG. 11B is a diagram illustrating a power supply voltage and gamma voltages according to a maximum voltage code illustrated in FIG. 11A in a power-saving mode.

FIG. 11B is a diagram illustrating the power supply voltage AVDD and the gamma voltages VGMA1, VGMA3, VGMA5, VGMA7, and VGMA9 according to the maximum voltage code M_VCODE illustrated in FIG. 11A in the power-saving mode. In this case, the diagram compares voltage levels between the power supply voltage AVDD and each of the gamma voltages VGMA1, VGMA3, VGMA5, VGMA7, and VGMA9.

Referring to FIGS. 5, 11A, and 11B, when the gray level of the image data signal DS is 255G, the luminance of an image displayed in the display panel DP (refer to FIG. 3) is 1000 nits, and when the gray level of the image data signal DS is 123G, the luminance of an image displayed in the display panel DP is 200 nits. In this case, "G" has the meaning of a gray level.

In the example illustrated in FIG. 11A, for the degradation compensation value C_AGE of "49", when the peak voltage code P_VCODE is set to "3918", the maximum voltage calculator 130 generates the output of "3967" as the maximum voltage code M_VCODE.

When the maximum voltage code M_VCODE is "3967", the voltage controller 150 may generates the outputs of the power supply voltage AVDD and the gamma voltages VGMA1, VGMA3, VGMA5, VGMA7, and VGMA9 as illustrated in FIG. 11B.

The peak voltage code P_VCODE of "3918" may correspond to the voltage level of 9.3 V, and the maximum voltage code M_VCODE of "3967" may correspond to the voltage level of 9.4 V.

In the power-saving mode, the voltage controller 150 maintains the voltage levels of the gamma voltages VGMA9 and VGMA7, which are lower than the voltage level of 9.4 V corresponding to the maximum voltage code M_VCODE, to be identical to the normal mode. In addition, the voltage controller 150 maintains the gamma voltage VGMA5 whose voltage level is higher than the voltage level of 9.4 V corresponding to the maximum voltage code M_VCODE and is the closest to the voltage level of 9.4 V, to be identical to the normal mode. In an embodiment, the gamma voltage VGMA5 whose voltage level is higher than the voltage level corresponding to the maximum voltage code M_VCODE and is the closest to the voltage level corresponding to the maximum voltage code M_VCODE may be called the maximum gamma voltage.

In the power-saving mode, the voltage controller 150 may change the voltage levels of the gamma voltages VGMA3 and VGMA1 and the power supply voltage AVDD, which are greater than the gamma voltage VGMA5 which is the maximum gamma voltage of 9.5 V, to 9.6 V, 9.7 V, and 10.7 V, respectively. The voltage controller 150 outputs the voltage control signal VCTRL corresponding to the voltage levels of the power supply voltage AVDD and the gamma voltages VGMA1, VGMA3, VGMA5, VGMA7, and VGMA9.

In the power-saving mode, when the peak luminance is 200 nits, the gamma voltages VGMA3 and VGMA1 which are required to generate grayscale voltages for obtaining luminance higher than the peak luminance are not used in the data driving circuit 200. Accordingly, the driving controller 100 may decrease the voltage levels of the gamma voltages VGMA3 and VGMA1 which are not required and also decrease the voltage level of the power supply voltage AVDD to be appropriate for the gamma voltages VGMA3 and VGMA1 of the decreased voltage levels. In this case, both of the power consumption of the second voltage generator 500 (refer to FIG. 3) and the data driving circuit 200 (refer to FIG. 3) are reduced.

Figure 12A:
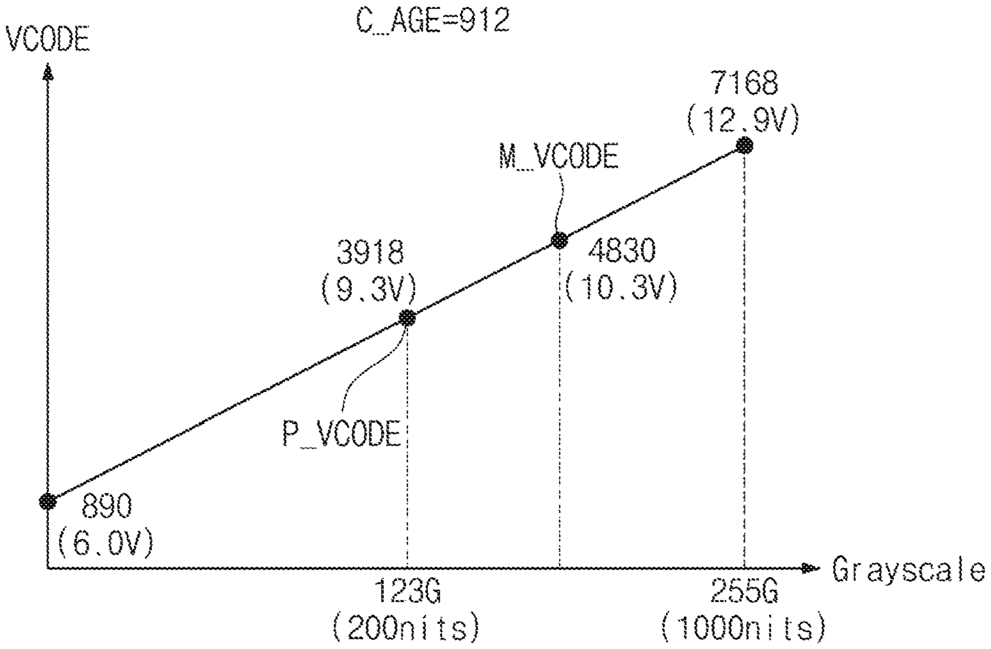
FIG. 12A illustrates a peak voltage code and a maximum voltage code when peak luminance is 200 nits.

FIG. 12A illustrates the peak voltage code P_VCODE and the maximum voltage code M_VCODE when the peak luminance is 200 nits.

Figure 12B:
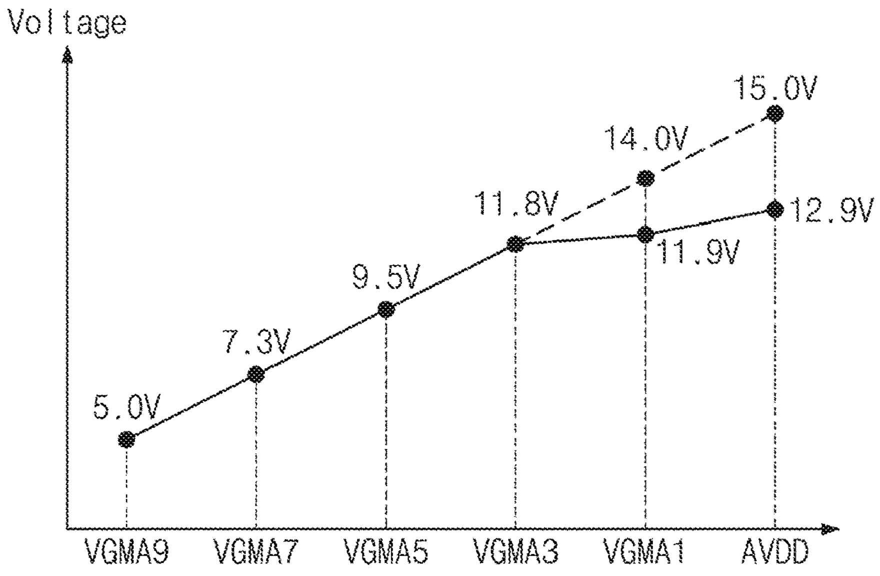
FIG. 12B is a diagram illustrating a power supply voltage and gamma voltages according to a maximum voltage code illustrated in FIG. 12A in a power-saving mode.

FIG. 12B is a diagram illustrating the power supply voltage AVDD and the gamma voltages VGMA1, VGMA3, VGMA5, VGMA7, and VGMA9 according to the maximum voltage code M_VCODE illustrated in FIG. 12A in the power-saving mode. In this case, the diagram compares voltage levels between the power supply voltage AVDD and each of the gamma voltages VGMA1, VGMA3, VGMA5, VGMA7, and VGMA9.

The peak voltage code P_VCODE illustrated in FIG. 12A is "3918" which is the same as the peak voltage code P_VCODE illustrated in FIG. 11A. However, in FIG. 12A, the degradation compensation value C_AGE increases to "912" from "49".

Referring to FIGS. 5, 12A, and 12B, for the degradation compensation value C_AGE of "912", when the peak voltage code P_VCODE is set to "3918", the maximum voltage calculator 130 generates the output the value of "4830" as the maximum voltage code M_VCODE. In an embodiment, the value of "4830" is the maximum voltage code M_VCODE and may correspond to 10.3 V.

In the power-saving mode, the voltage controller 150 maintains the voltage levels of the gamma voltages VGMA9, VGMA7, and VGMA5, which are lower than the voltage level of 10.3 V corresponding to the maximum voltage code M_VCODE, to be identical to the normal mode. In addition, the voltage controller 150 maintains the gamma voltage VGMA3 whose voltage level is higher than the voltage level of 10.3 V corresponding to the maximum voltage code M_VCODE and is the closest to the voltage level of 10.3 V, to be identical to the normal mode. In an embodiment, the gamma voltage VGMA3 whose voltage level of 11.3 V is higher than the voltage level corresponding to the maximum voltage code M_VCODE of 10.3 V and is the closest to the voltage level corresponding to the maximum voltage code M_VCODE may be called the maximum gamma voltage.

In the power-saving mode, the voltage controller 150 may change the voltage levels of the gamma voltage VGMA1 and the power supply voltage AVDD, which are greater than the gamma voltage VGMA3 which is the maximum gamma voltage of 11.8 V, to 11.9 V and 12.9 V, respectively. The voltage controller 150 generates outputs of the voltage control signal VCTRL corresponding to the voltage levels of the power supply voltage AVDD and the gamma voltages VGMA1, VGMA3, VGMA5, VGMA7, and VGMA9.

As described above, the light emitting element ED in the pixel PX (refer to FIG. 4) may be degraded based on the operating time. The gray level of the image data signal DS for displaying an image of given luminance when the operating time becomes longer has to become higher than when the operating time becomes shorter. Thus, in this case, the gray level of the image data signal DS for displaying an image of given luminance may depend on the operating time.

As understood from FIGS. 11A and 12A, when the degree of degradation of the light emitting element ED increases, the degradation compensation value C_AGE may increase. In this case, the maximum voltage code M_VCODE may become greater even though the peak voltage code P_VCODE is identically maintained.

Figure 13A:
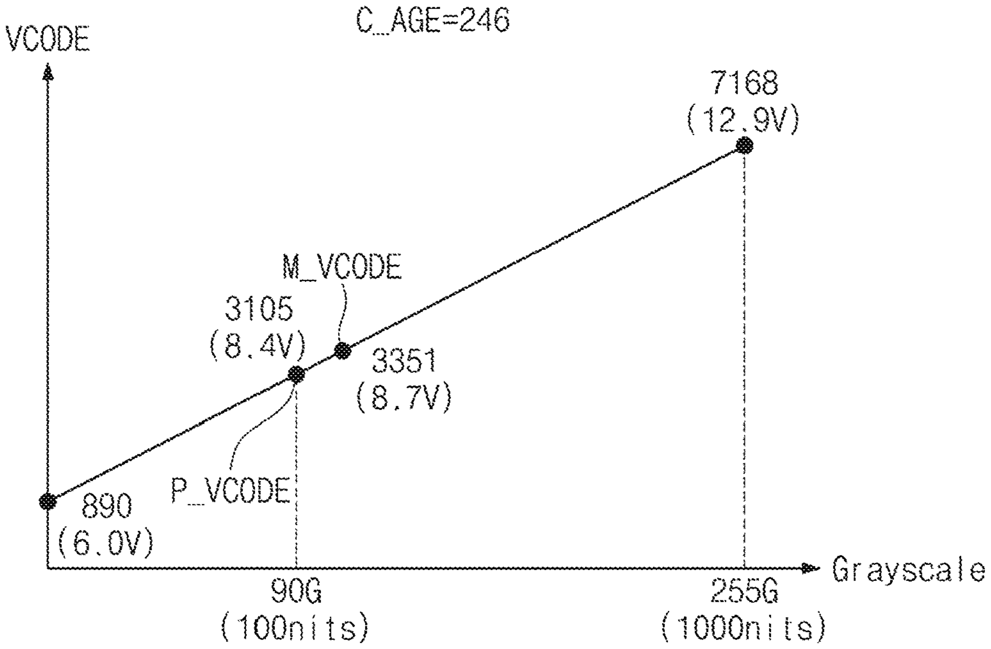
FIG. 13A illustrates a peak voltage code and a maximum voltage code when peak luminance is 100 nits.

FIG. 13A illustrates the peak voltage code P_VCODE and the maximum voltage code M_VCODE when the peak luminance is 100 nits.

Figure 13B:
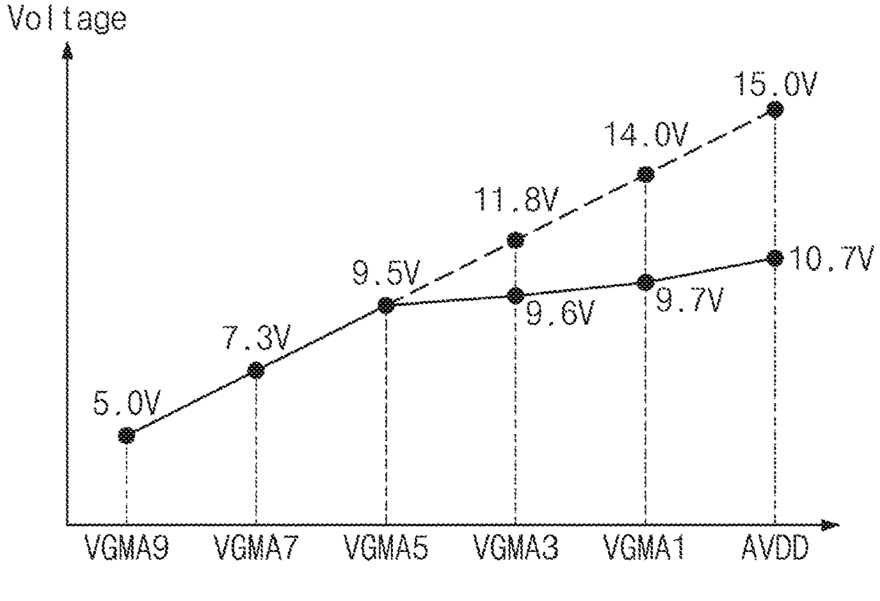
FIG. 13B is a diagram illustrating a power supply voltage and gamma voltages according to a maximum voltage code illustrated in FIG. 13A in a power-saving mode.

FIG. 13B is a diagram illustrating the power supply voltage AVDD and the gamma voltages VGMA1, VGMA3, VGMA5, VGMA7, and VGMA9 according to the maximum voltage code M_VCODE illustrated in FIG. 13A in the power-saving mode. In this case, the diagram compares voltage levels between the power supply voltage AVDD and each of the gamma voltages VGMA1, VGMA3, VGMA5, VGMA7, and VGMA9.

Referring to FIGS. 5, 13A, and 13B, when the gray level of the image data signal DS is 255G, the luminance of an image which is displayed in the display panel DP (refer to FIG. 3) is 1000 nits, and when the gray level of the image data signal DS is 90G, the luminance of an image which is displayed in the display panel is 100 nits.

In the example illustrated in FIG. 13A, for the degradation compensation value C_AGE of "246", when the peak voltage code P_VCODE is set to "3105", the maximum voltage calculator 130 generates the output of "3351" as the maximum voltage code M_VCODE.

When the maximum voltage code M_VCODE is "3351", the voltage controller 150 may output the power supply voltage AVDD and the gamma voltages VGMA1, VGMA3, VGMA5, VGMA7, and VGMA9 as illustrated in FIG. 13B.

The peak voltage code P_VCODE of "3105" may correspond to the voltage level of 8.4 V, and the maximum voltage code M_VCODE of "3351" may correspond to the voltage level of 8.7 V.

In the power-saving mode, the voltage controller 150 maintains the voltage levels of the gamma voltages VGMA9 and VGMA7, which are lower than the voltage level of 8.7 V corresponding to the maximum voltage code M_VCODE, to be identical to the normal mode. In addition, the voltage controller 150 maintains the gamma voltage VGMA5 whose voltage level is higher than the voltage level of 8.7 V corresponding to the maximum voltage code M_VCODE and is the closest to the voltage level of 8.7 V, to be identical to the normal mode. In an embodiment, the gamma voltage VGMA5 of 9.5 V whose voltage level is higher than the voltage level corresponding to the maximum voltage code M_VCODE of 8.7 V and is the closest to the voltage level corresponding to the maximum voltage code M_VCODE may be called the maximum gamma voltage.

In the power-saving mode, the voltage controller 150 may change the voltage levels of the gamma voltage VGMA3 and VGMA1 and the power supply voltage AVDD, which are greater than the gamma voltage VGMA5 which is the maximum gamma voltage of 9.5 V, to 9.6 V, 9.7 V, and 10.7 V, respectively. The voltage controller 150 generates outputs of the voltage control signal VCTRL corresponding to the voltage levels of the power supply voltage AVDD and the gamma voltages VGMA1, VGMA3, VGMA5, VGMA7, and VGMA9.

In the power-saving mode, when the peak luminance is 200 nits, the gamma voltages VGMA3 and VGMA1 which is required to generate grayscale voltages for obtaining luminance higher than the peak luminance are not used in the data driving circuit 200. Accordingly, the driving controller 100 may decrease the voltage levels of the gamma voltages VGMA3 and VGMA1 being unnecessary and also decreases the voltage level of the power supply voltage AVDD to be appropriate for the gamma voltages VGMA3 and VGMA1 of the decreased voltage levels. In this case, both of the power consumption of the second voltage generator 500 (refer to FIG. 3) and the data driving circuit 200 (refer to FIG. 3) are reduced.

Figure 14A:
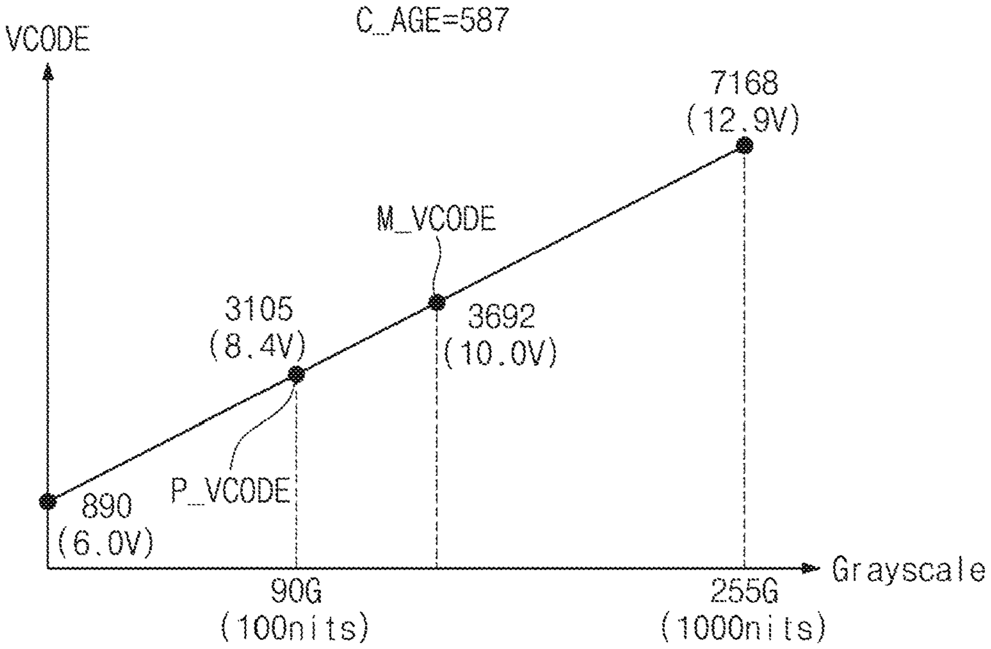
FIG. 14A illustrates a peak voltage code and a maximum voltage code when peak luminance is 100 nits.

FIG. 14A illustrates the peak voltage code P_VCODE and the maximum voltage code M_VCODE when the peak luminance is 100 nits.

Figure 14B:
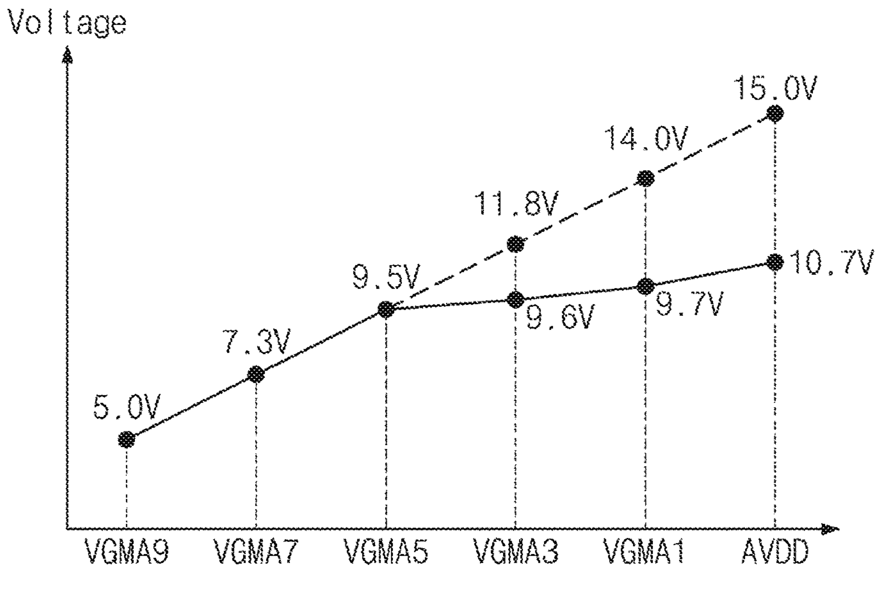
FIG. 14B is a diagram illustrating a power supply voltage and gamma voltages according to a maximum voltage code illustrated in FIG. 14A in a power-saving mode.

FIG. 14B is a diagram illustrating the power supply voltage AVDD and the gamma voltages VGMA1, VGMA3, VGMA5, VGMA7, and VGMA9 according to the maximum voltage code M_VCODE illustrated in FIG. 14A in the power-saving mode. In this case, the diagram compares voltage levels between the power supply voltage AVDD and each of the gamma voltages VGMA1, VGMA3, VGMA5, VGMA7, and VGMA9.

The peak voltage code P_VCODE illustrated in FIG. 14A is "3105" which is the same as the peak voltage code P_VCODE illustrated in FIG. 13A; however, in FIG. 14A, the degradation compensation value C_AGE increases to the value of "587" from "246".

As referring to FIGS. 5, 14A, and 14B, for the degradation compensation value C_AGE of "587", when the peak voltage code P_VCODE is set to "3105", the maximum voltage calculator 130 generates the output "3692" as the maximum voltage code M_VCODE. The output value of "3692" is the maximum voltage code M_VCODE and may correspond to 10.0 V.

In the power-saving mode, the voltage controller 150 maintains the voltage levels of the gamma voltages VGMA9, VGMA7, and VGMA5, which are lower than the voltage level of 10.0 V corresponding to the maximum voltage code M_VCODE, to be identical to the normal mode. In addition, the voltage controller 150 may change the voltage levels of the gamma voltage VGMA3 and VGMA1 and the power supply voltage AVDD, which are higher than the voltage level of 10.0 V corresponding to the maximum voltage code M_VCODE, to 9.6 V, 9.7 V, and 10.7 V, respectively. The voltage controller 150 generates outputs of the voltage control signal VCTRL corresponding to the voltage levels of the power supply voltage AVDD and the gamma voltages VGMA1, VGMA3, VGMA5, VGMA7, and VGMA9.

When the peak luminance decreases to 100 nits, the voltage controller 150 may further reduce power consumption by decreasing the voltage levels of the gamma voltage VGMA3 and VGMA1 and the power supply voltage AVDD, which are higher than the voltage level of 10.0 V corresponding to the maximum voltage code M_VCODE.

The display device with the above configuration may set voltage levels of a power supply voltage and a gamma voltage in consideration of an operation mode and a degradation state. Accordingly, the power consumption of the display device may be minimized.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel;

a driving controller configured to receive an input image signal and to generate an output of an image data signal based on the input image signal;

a voltage generator configured to generate a plurality of gamma voltages in response to a voltage control signal; and a data driving circuit configured to receive the plurality of gamma voltages and to provide a data signal corresponding to the image data signal to the display panel, wherein the driving controller operates between in a normal mode and in a power-saving mode, wherein, in the power-saving mode, the driving controller generates the voltage control signal for changing voltage levels of the plurality of gamma voltages in response to the input image signal and a peak signal, wherein, in the normal mode, at least one of the plurality of gamma voltages has a first voltage level, and wherein, in the power-saving mode, at least one of the plurality of gamma voltages has a second voltage level which is lower than the first voltage level.

2. The display device of claim 1, wherein the driving controller is configured to:

generate a peak gray signal corresponding to the input image signal and the peak signal, generate a maximum voltage code based on a peak voltage code corresponding to the peak gray signal and a degradation compensation value corresponding to an operating time, and generate an output of the voltage control signal corresponding to the maximum voltage code.

3. The display device of claim 2, wherein the driving controller is configured to:

operate in the power-saving mode when the maximum voltage code is smaller than a reference value, and operate in the normal mode when the maximum voltage code is equal to the reference value.

4. The display device of claim 1, wherein the voltage generator is configured to:

further generate a power supply voltage to the data driving circuit.

5. The display device of claim 4, wherein the driving controller is configured to:

generate an output of the voltage control signal for changing a voltage level of the power supply voltage in the power-saving mode.

6. The display device of claim 5, wherein, in the power-saving mode, the voltage level of the power supply voltage is lower than the voltage level of the power supply voltage in the normal mode.

7. The display device of claim 1, wherein the driving controller includes:

a power control module configured to output a peak gray signal in response to the peak signal;

a peak voltage memory configured to store a peak voltage code corresponding to the peak gray signal from the power control module;

a degradation compensator configured to provide a degradation compensation value corresponding to an operating time;

a maximum voltage calculator configured to generate an output of a maximum voltage code based on the peak voltage code from the peak voltage memory and the degradation compensation value from the degradation compensator; and a voltage controller configured to generate an output of the voltage control signal based on the maximum voltage code from the maximum voltage calculator.

8. The display device of claim 7, wherein the maximum voltage calculator is configured to:

add the peak voltage code and the degradation compensation value, and generate an output of the maximum voltage code corresponding to a result of an addition of the peak voltage code and the degradation compensation value.

9. The display device of claim 7, wherein, in the power-saving mode, some of the plurality of gamma voltages whose voltage levels are lower than a voltage level corresponding to the maximum voltage code are maintained at equal voltage levels to the normal mode.

10. The display device of claim 7, wherein, in the power-saving mode, one of the plurality of gamma voltages whose voltage level is higher than a voltage level corresponding to the maximum voltage code and is a closest to the voltage level corresponding to the maximum voltage code is maintained at a same voltage level as the normal mode.

11. The display device of claim 7, wherein, in the power-saving mode, at least one of the plurality of gamma voltages whose voltage level is higher than a voltage level corresponding to the maximum voltage code is changed to a voltage level lower than in the normal mode.

12. The display device of claim 7, wherein the degradation compensator is configured to:

receive a feedback current from the display panel, and provide the degradation compensation value based on the feedback current and the operating time.

13. A driving controller comprising:

a power control module configured to output a peak gray signal in response to a peak signal;

a peak voltage memory configured to store a peak voltage code corresponding to the peak gray signal provided from the power control module;

a degradation compensator configured to provide a degradation compensation value corresponding to an operating time;

a maximum voltage calculator configured to generate an output of a maximum voltage code based on the peak voltage code provided from the peak power voltage memory and the degradation compensation value provided from the degradation compensator; and a voltage controller configured to generate an output of a voltage control signal for adjusting voltage levels of a plurality of gamma voltages based on the maximum voltage code provided from the maximum voltage calculator.

14. The driving controller of claim 13, wherein the voltage controller is configured to:

operate in a power-saving mode when the maximum voltage code is smaller than a reference value, and operate in a normal mode when the maximum voltage code is equal to the reference value.

15. The driving controller of claim 14, wherein the maximum voltage calculator is configured to:

add the peak voltage code and the degradation compensation value, and generate an output of the maximum voltage code corresponding to a result of an addition of the peak voltage code and the degradation compensation value.

16. The driving controller of claim 14, wherein, in the power-saving mode, the voltage controller maintains some of the plurality of gamma voltages whose voltage levels are lower than a voltage level corresponding to the maximum voltage code at equal voltage levels to the normal mode.

17. The driving controller of claim 14, wherein, in the power-saving mode, the voltage controller maintains one of the plurality of gamma voltages whose voltage level is higher than a voltage level corresponding to the maximum voltage code and is a closest to the voltage level corresponding to the maximum voltage code at a same voltage level as the normal mode.

18. The driving controller of claim 14, wherein, in the power-saving mode, the voltage controller changes at least one of the plurality of gamma voltages whose voltage level is higher than a voltage level corresponding to the maximum voltage code to a voltage level lower than in the normal mode.

19. An operation method of a display device, the method comprising:

generating a plurality of gamma voltages in response to a voltage control signal;

providing a data signal corresponding to an input image signal to a display panel based on the plurality of gamma voltages; and generating the voltage control signal in response to the input image signal and a peak signal such that a voltage level of each of the plurality of gamma voltages corresponds to one of a normal mode and a power-saving mode, wherein, in the normal mode, at least one of the plurality of gamma voltages has a first voltage level, and wherein, in the power-saving mode, at least one of the plurality of gamma voltages has a second voltage level which is lower than the first voltage level.

20. The method of claim 19, wherein the generating of the voltage control signal is accomplished by:

generating a peak voltage code in response to the input image signal and the peak signal, generating a degradation compensation value corresponding to an operating time, generating a maximum voltage code based on the peak voltage code and the degradation compensation value, and generating the voltage control signal based on the maximum voltage code.

* * * * *